(12) United States Patent
Oliveira et al.

(10) Patent No.: US 7,558,926 B1
(45) Date of Patent: Jul. 7, 2009

(54) CONTINUOUS DATA BACKUP USING DISTRIBUTED JOURNALING

(75) Inventors: Fernando Oliveira, Sudbury, MA (US); Jeffrey A. Schriesheim, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 3 days.

(21) Appl. No.: 11/983,774

(22) Filed: Nov. 10, 2007

Related U.S. Application Data

(63) Continuation of application No. 10/802,489, filed on Mar. 16, 2004, now Pat. No. 7,318,134.

(51) Int. Cl.
*G06F 12/16* (2006.01)
(52) U.S. Cl. ...................... 711/161; 711/162
(58) Field of Classification Search ................. None
See application file for complete search history.

(56) References Cited

U.S. PATENT DOCUMENTS

| 5,239,637 A * | 8/1993 | Davis et al. ................. 711/165 |
| 6,993,635 B1 * | 1/2006 | Gazit et al. ................. 711/162 |
| 2003/0135783 A1 * | 7/2003 | Martin et al. ................. 714/13 |
| 2003/0188229 A1 * | 10/2003 | Lubbers et al. ............... 714/47 |

* cited by examiner

*Primary Examiner*—Than Nguyen
(74) *Attorney, Agent, or Firm*—Muirhead and Saturnelli, LLC

(57) ABSTRACT

Described are techniques used in connection with providing continuous data backups of primary storage. A first technique uses distributed partial journals and a copy of the primary storage. A distributed partial journal is used for each input port. The partial journals are periodically incorporated into a main journal in accordance with a time stamp for the data modification recorded in each partial journal entry. A second technique, a copy on write, uses the distributed partial journals without requiring a copy of the primary storage. For each write to an address, the current contents of the address is journaled before the address on primary storage is updated.

18 Claims, 17 Drawing Sheets

CONTINUOUS DATA BACKUP USING DISTRIBUTED JOURNALING

RELATED APPLICATIONS

This application is a continuation of U.S. patent application Ser. No. 10/802,489 (now U.S. Pat. No. 7,318,134, issued Jan. 8, 2008), filed on Mar. 16, 2004, entitled CONTINUOUS DATA BACKUP USING DISTRIBUTED JOURNALING, which is incorporated by reference herein in its entirety.

BACKGROUND OF THE INVENTION

1. Technical Field

This application relates to computer storage devices, and more particularly to the field of transferring data between storage devices.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. Nos. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A backup copy of one or more of the actual devices, or portions thereof, may be maintained. Different techniques may be used in connection with providing a backup copy of data. Backup copies may be made on disks using a log or journal file of changes made with reference to a specific point-in-time copy of the data. One drawback with existing techniques is that a duplicate copy of the data may be used as the specific point-in-time copy. Also, there may be contention with reference to the journal or log file, for example, when in use by multiple hosts performing write operations. Maintaining the journal or log file may also be expensive in terms of execution time required to performing the write operation to the journal or log file.

Thus, it may be desirable to use a technique that provides a continuous backup of data while overcoming one or more drawbacks of the existing techniques. It may be desirable to use a technique which provides a continuous backup of data while reducing contention and execution time associated with performing a journaling or logging operation. It may be desirable to use a technique which provides a copy of the data without using a duplicate copy of the data such as with reference to a complete point-in-time copy of the data.

SUMMARY OF THE INVENTION

In accordance with one aspect of the invention is a method for providing a backup copy of data on a primary storage comprising: receiving a write request; journaling said write request in one of a plurality of partial journals; and updating said primary storage in accordance with said write request. The method may also include receiving each of said plurality of partial journals having a plurality of partial journal entries; and merging said plurality of partial journal entries in accordance with a predetermined merging time period forming a merged partial journal entry for a particular storage location, said merged partial journal entry reflecting application of data modifications for said particular storage location for said predetermined merging time period. A primary journal may include a first portion of for received partial journal entries and a second portion for merged partial journal entries. Each partial journal entry in said plurality of partial journals may include a time stamp associated with a write request. The method may include periodically flushing said plurality of partial journals to a primary journal. Contents of each partial journal may be included in a primary journal when said each partial journal is filled in accordance with a predetermined capacity level. Partial journal entries within said primary journal may be ordered in accordance with a time stamp value associated with each of said partial journal entries, and each of said merged partial journal entries within said primary journal may be ordered in accordance with a time stamp value associated with each of said merged journal entries. Each of said plurality of partial journals may be associated with an input port in a switch and includes journal entries for all write requests received on said associated input port. Journaling of write requests received on an input port may be performed by a processor associated with said input port and a partial log associated with said input port may be stored on a portion of memory associated with said input port. The write request may be made with respect to a copy of data included on said primary storage. The primary storage may be one of: a physical device, a logical device, a virtual device, and a portion of one or more different devices. Each of said time stamp values may be obtained using a phase lock loop processing technique and using actual time values periodically broadcast from a stable time base. Each of said partial journal entries may include a time stamp value associated with a corresponding write request, wherein each time stamp value included in a first partial journal is synchronized with other time stamp values included in a second different partial journal. Each partial journal may be associated with an input port and all write requests from that input port are journaled in the corresponding each partial journal and wherein each merged partial journal entry may include an indicator indicating the validity of journal entries received from each input port in accordance with a time stamp value associated with said merged partial journal entry. The journaling and the updating may be issued simultaneously. Each partial journal entry may include a status indicator reflecting a status of both said journaling and said updating.

In accordance with another aspect of the invention is a system that performs a continuous back up of data included in a primary storage unit, comprising: a switch including input ports, each of said input ports being associated with a processor and a portion of memory; a plurality of partial journals, each of said plurality of partial journals being associated with a unique one of said input ports and being stored in said portion of memory associated with said unique input port, said each partial journal including journal entries for write requests received on said unique input port; and a primary journal incorporating portions of said plurality of partial journals associated with write requests that have occurred earlier in time than those entries currently included in said partial journals. The system may also include a stable time base that broadcasts an actual time periodically to each of said processors included in said switch; and wherein associated with each of said processors is a phase lock loop component that maintains a time value synchronized with other time values maintained by other phase lock loop components, each of said journal entries in said partial journals including a time stamp value associated with a received write request in accordance with a time of an associated phase lock loop component. Each partial journal entry included in a partial journal may include a data value of a location after applying a modification to data at said location associated with a write request corresponding to said each partial journal entry. Each partial journal entry included in a partial journal may include a data value of a location prior to applying an update of a write request corresponding to said each partial journal entry.

In accordance with another aspect of the invention is a method for providing a backup copy of data on a primary storage comprising: receiving a write request for a location in primary storage; receiving a copy of data at said location on said primary storage; journaling said write request in one of a plurality of partial journals in a partial journal entry including said copy prior to performing said write request; and updating said primary storage in accordance with said write request. Partial journal entries in said partial journals may have an associated time stamp value, said partial journal entries being ordered in accordance with associated time stamp values. The partial journal entries may be transferred from said partial journals to a primary journal. The method may also include merging a portion of said partial journal entries for a predetermined time period for write requests to a storage location producing a merged partial journal entry for said storage location. A backup copy of said primary storage with respect to a point in time equal to or less than a current time value may be produced using said plurality of partial journals and said primary storage without maintaining a copy of said primary storage.

In accordance with another aspect of the invention is a method of creating a point-in-time copy of a primary storage comprising: receiving journal entries corresponding to write requests formed using a plurality of distributed partial journals, each partial journal being associated with a portion of write requests, said journal entries being ordered in accordance with a time value associated with each of said write requests, each of said journal entries including a value for a corresponding portion of primary storage before performing a write request; creating a map of pointers to said primary storage wherein each pointer is associated with a particular location identifier; and performing, for each of said journal entries including a location identifier and a data value prior to performing a write request: determining a corresponding map pointer for each location identifier included in a journal entry; and if said corresponding map pointer points to a value in the primary storage, then adjusting the map pointer to point to said data value in said each journal entry. Each of said partial journals may include partial journal entries for write requests received on a particular input port to a switch, said each partial journal being stored in a portion of memory associated with said input port, wherein journaling of write requests to that input port is performed by a processor associated with said input port.

In accordance with another aspect of the invention is a computer program product that provides a backup copy of data on a primary storage comprising code that: receives a write request; journals said write request in one of a plurality of partial journals; and updates said primary storage in accordance with said write request. The computer program product may include code that: receives each of said plurality of partial journals having a plurality of partial journal entries; and merges said plurality of partial journal entries in accordance with a predetermined merging time period forming a merged partial journal entry for a particular storage location, said merged partial journal entry reflecting application of data modifications for said particular storage location for said predetermined merging time period. A primary journal may include a first portion of for received partial journal entries and a second portion for merged partial journal entries. Each partial journal entry in said plurality of partial journals may include a time stamp associated with a write request. The computer program product may also include code that: periodically flushes said plurality of partial journals to a primary journal. Contents of each partial journal may be included in a primary journal when said each partial journal is filled in accordance with a predetermined capacity level. Partial journal entries within said primary journal may be ordered in accordance with a time stamp value associated with each of said partial journal entries, and each of said merged partial journal entries within said primary journal may be ordered in accordance with a time stamp value associated with each of said merged journal entries. Each of said plurality of partial journals may be associated with an input port in a switch and may include journal entries for all write requests received on said associated input port. Journaling of write requests received on an input port may be performed by a processor associated with said input port and a partial log associated with said input port may be stored on a portion of memory associated with said input port. The write request may be made with respect to a copy of data included on said primary storage. The primary storage may be one of: a physical device, a logical device, a virtual device, and a portion of one or more different devices. Each of said time stamp values may be obtained using a phase lock loop processing technique and using actual time values periodically broadcast from a stable time base. Each of said partial journal entries may include a time stamp value associated with a corresponding write request, wherein each time stamp value included in a first partial journal is synchronized with other time stamp values included in a second different partial journal. Each partial journal may be associated with an input port and all write requests from that input port may be journaled in the corresponding each partial journal and wherein each merged partial journal entry may include an indicator indicating the validity of journal entries received from each input port in accordance with a time stamp value associated with said merged partial journal entry. The journaling and the updating may be issued simultaneously. Each partial journal entry may include a status indicator reflecting a status of both said journaling and said updating.

In accordance with another aspect of the invention is a computer program product that provides a backup copy of data on a primary storage comprising code that: receives a write request for a location in primary storage; receives a copy of data at said location on said primary storage; journals said write request in one of a plurality of partial journals in a partial journal entry including said copy prior to performing said write request; and updates said primary storage in accordance with said write request. Partial journal entries in said partial journals may have an associated time stamp value, said partial journal entries being ordered in accordance with associated time stamp values. The partial journal entries may be transferred from said partial journals to a primary journal. The computer program product may include code that merges a portion of said partial journal entries for a predetermined time period for write requests to a storage location producing a merged partial journal entry for said storage location. A backup copy of said primary storage with respect to a point in time equal to or less than a current time value may be produced using said plurality of partial journals and said primary storage without maintaining a copy of said primary storage.

In accordance with another aspect of the invention is a computer program product that creates a point-in-time copy of a primary storage comprising code that: receives journal entries corresponding to write requests formed using a plurality of distributed partial journals, each partial journal being associated with a portion of write requests, said journal entries being ordered in accordance with a time value associated with each of said write requests, each of said journal entries including a value for a corresponding portion of primary storage before performing a write request; creates a map of pointers to said primary storage wherein each pointer is associated with a particular location identifier; and performs, for each of said journal entries including a location identifier and a data value prior to performing a write request: determining a corresponding map pointer for each location identifier included in a journal entry; and if said corresponding map pointer points to a value in the primary storage, then adjusting the map pointer to point to said data value in said each journal entry. Each of said partial journals may include partial journal entries for write requests received on a particular input port to a switch, said each partial journal being stored in a portion of memory associated with said input port, wherein journaling of write requests to that input port is performed by a processor associated with said input port.

BRIEF DESCRIPTION OF DRAWINGS

Features and advantages of the present invention will become more apparent from the following detailed description of exemplary embodiments thereof taken in conjunction with the accompanying drawings in which.

DETAILED DESCRIPTION OF EMBODIMENTS

Figure 1:
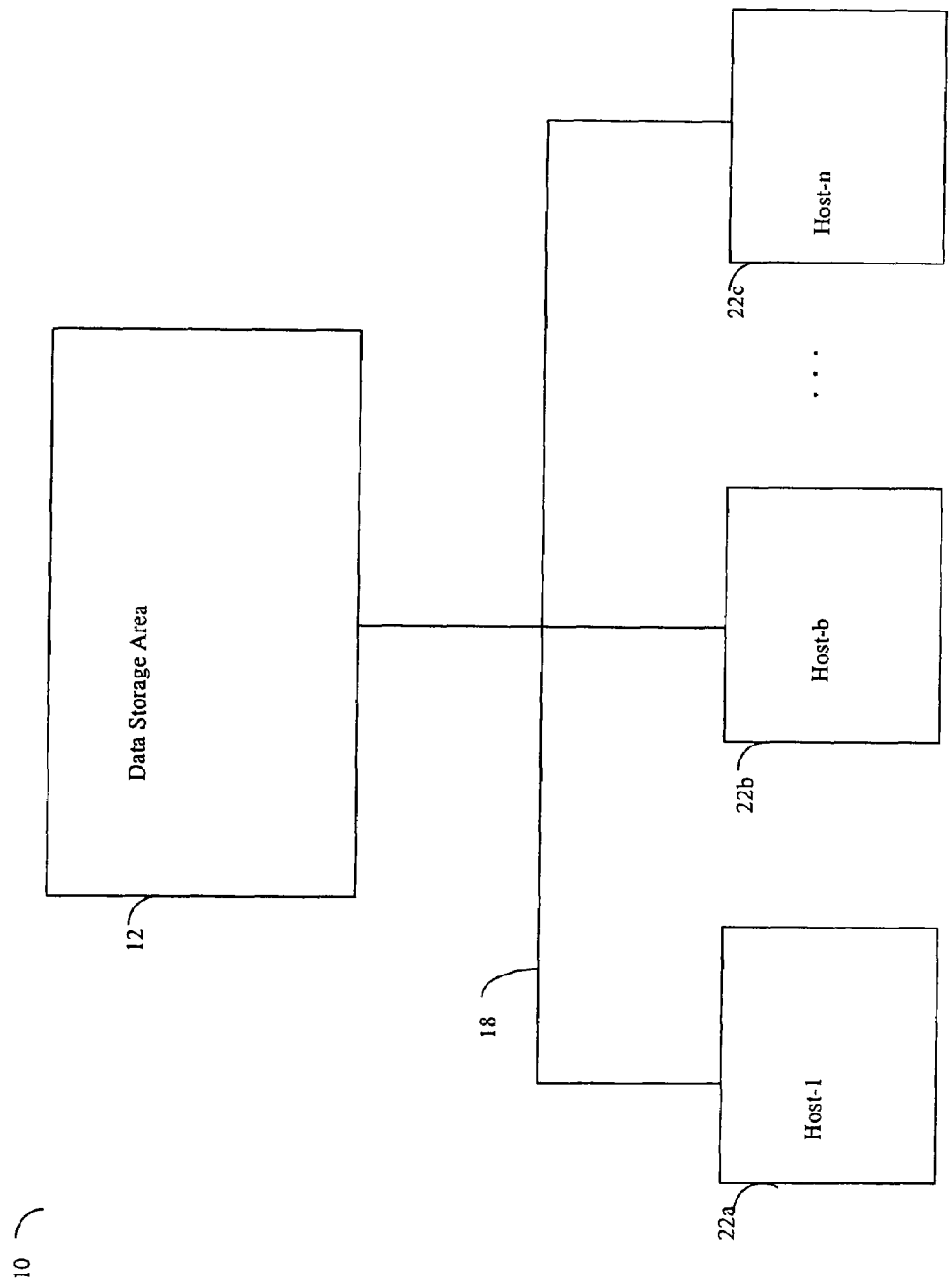
FIG. 1 is an example of an embodiment of a system described herein.

Referring now to FIG. 1, shown is an example of an embodiment of a computer system according to the present invention. The computer system 10 includes a data storage area 12 connected to host systems 22a-22c through communication medium 18. In this embodiment of the computer system 10, the N hosts 22a-22c may access the data storage area 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 22a-22c may access and communicate with the data storage area 12, and may also communicate with each other and other components included in the computer system 10.

Each of the host systems 22a-22c and the data storage area 12 included in the computer system 10 may be connected to the communication medium 18 by any one of a variety of connections as may be provided and supported in accordance with the type of communication medium 18. The processors included in the host computer systems 22a-22c may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 22a-22c and the data storage area 12 are described herein in more detail, and may vary with each particular embodiment. Each of the host computers 22a-22c may all be located at the same physical site, or, alternatively, may also be located in different physical locations. Examples of the communication medium that may be used to provide the different types of connections between the host computer systems and the data storage area of the computer system 10 may use a variety of different communication protocols such as SCSI, ESCON, Fibre Channel, or GIGE (Gigabit Ethernet), and the like. Some or all of the connections by which the hosts and data storage area 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 22a-22c may issue a data request to the data storage area 12 to perform a data operation, such as a read or write operation.

Figure 2:
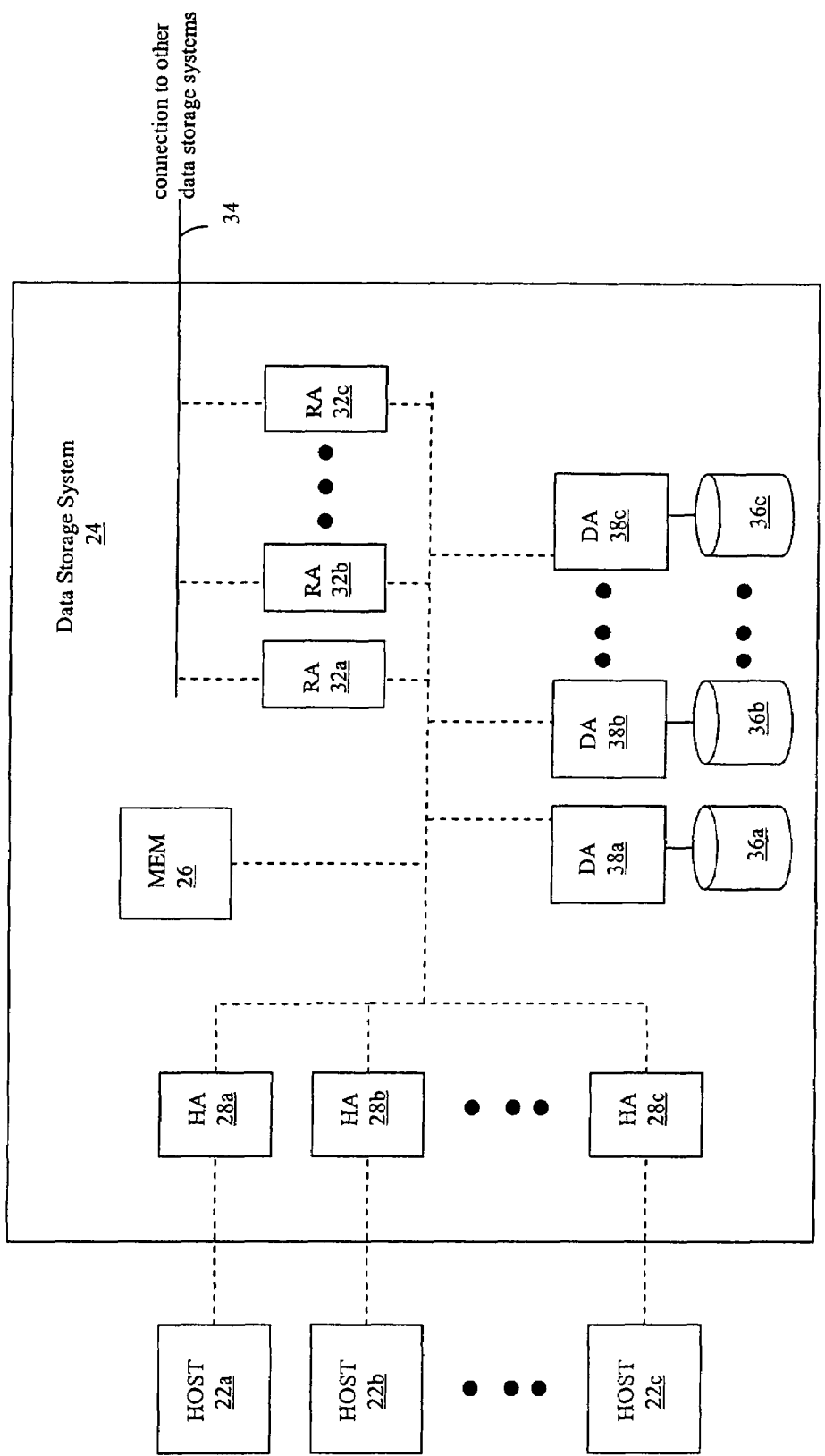
FIG. 2 is an example of a more detailed schematic diagram of the system of FIG. 1 showing a plurality of hosts and a data storage system included therein.

Referring now to FIG. 2, shown is a diagram 20 illustrating additional detail of one embodiment of the system 10 of FIG. 1. The plurality of hosts 22a-22c are coupled to a data storage system 24. The data storage system 24 may be one of a plurality of data storage systems included in the data storage area 12. The data storage system 24 includes an internal memory 26 that facilitates operation of the storage system 24 as described elsewhere herein. The data storage system also includes a plurality of host adaptors (HA's) 28a-28c that handle reading and writing of data between the hosts 22a-22c and the storage system 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage system 24 may include one or more RDF adapter units (RA's) 32a-32c. The RA's 32a-32c are coupled to an RDF link 34 and are similar to the HA's 28a-28c, but are used to transfer data between the storage system 24 and other storage system (not shown) that are also coupled to the RDF link 34. The storage system 24 may also include one or more disks 36a-36c, each containing a different portion of data stored on the storage device 24. Each of the disks 36a-36c may be coupled to a corresponding disk adapter unit (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage system 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c.

The storage system 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric.

Figure 3:
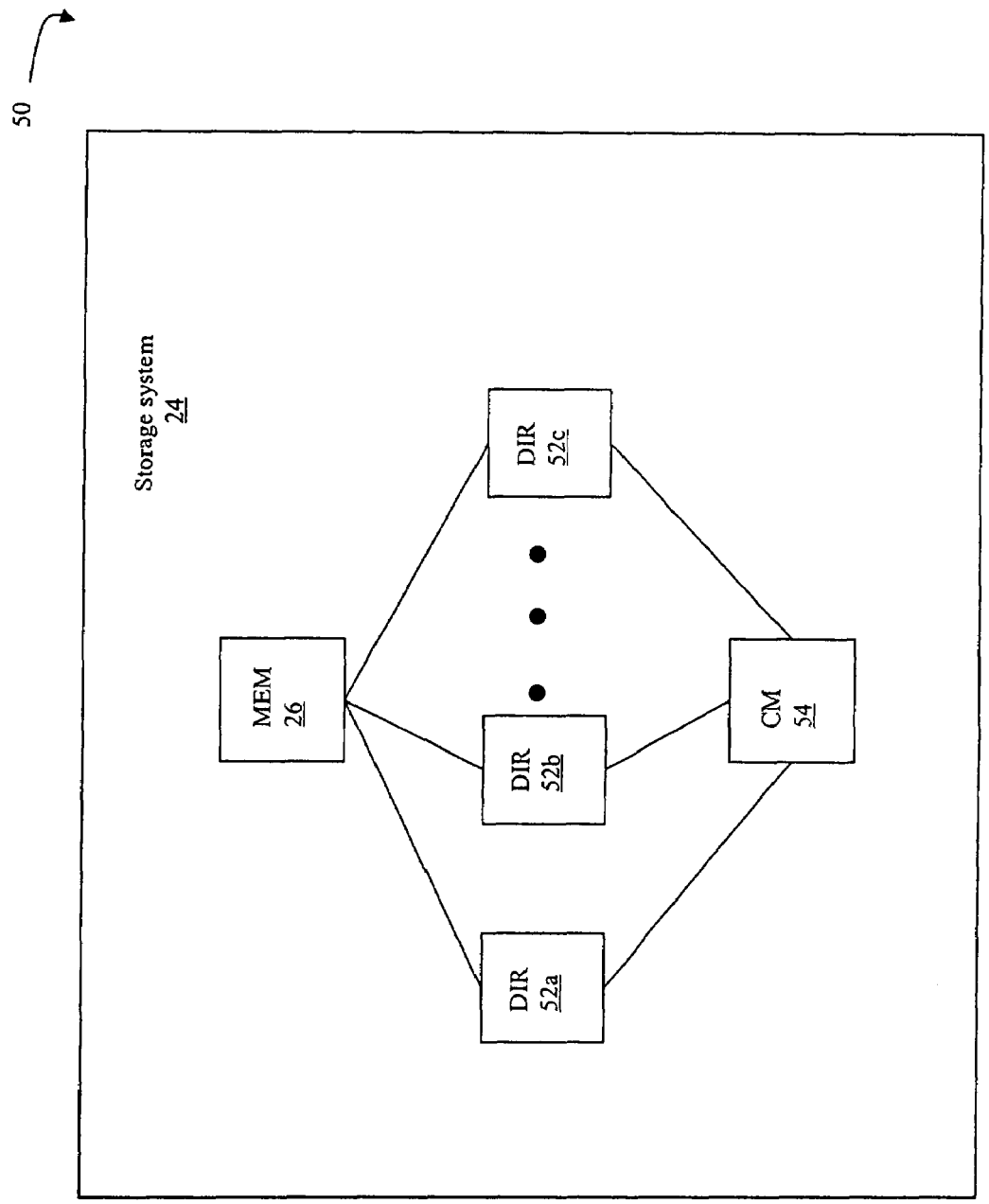
FIG. 3 is an example of an embodiment of a data storage system included in the system of FIGS. 1 and 2.

Referring now to FIG. 3, a diagram 50 illustrates an embodiment of the storage system 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixteen directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c.

Figure 4A:
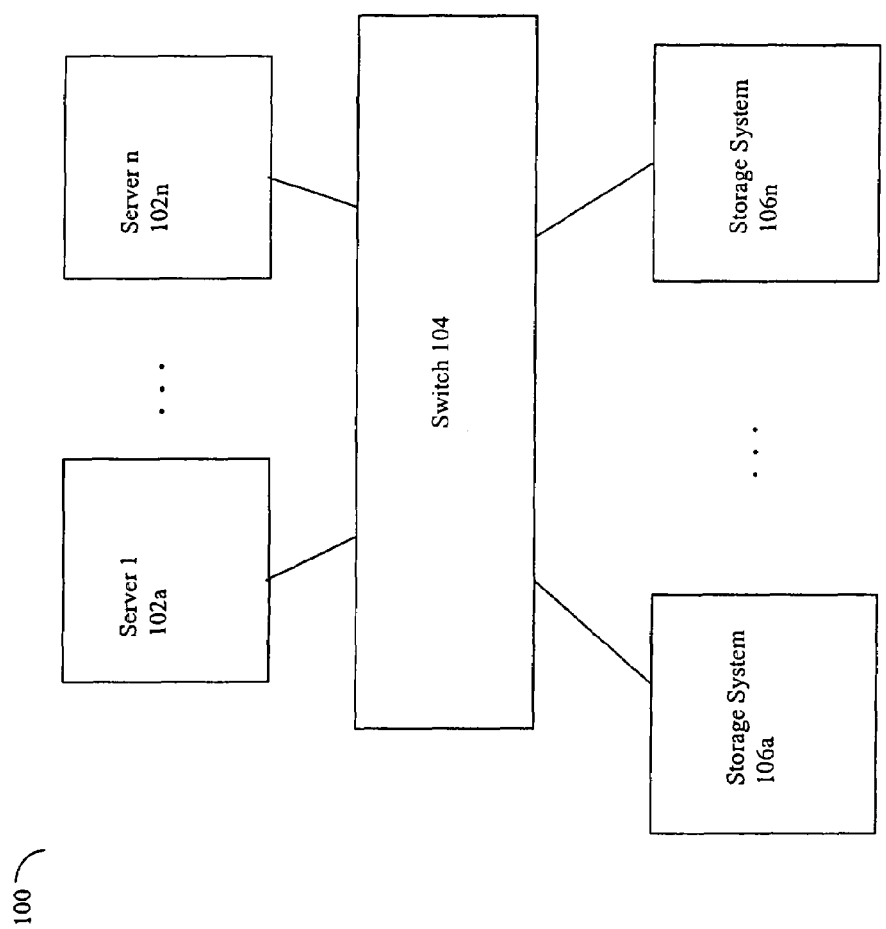
FIG. 4A is an example of a server coupled to a switch which is coupled to one or more data storage systems.

Referring now to FIG. 4A, a diagram 100 illustrates a plurality of servers 102a-102n coupled to a switch 104. The switch 104 is coupled to a plurality of storage systems 106a-106c. One or more of the storage systems 106a-106c may be like the storage system 24 described above. Alternatively, it is possible that none of the storage systems 106a-106c are like the storage system 24 described above. The system described herein contemplates an environment where all of the storage systems 106a-106c are alike (homogenous) or an environment where some of the storage systems 106a-106c are different (heterogeneous). The couplings between the servers 102a-102n, the switch 104, and the storage systems 106a-106c may be made in any appropriate fashion including (optionally) that one or more of the couplings is through one or more other devices (not shown) and/or through the Internet or some other network, of any size and configuration.

The switch 104 may be used to present to one or more of the servers 102a-102n one or more contiguous logical volumes or devices that correspond to storage on one or more of the storage devices 106a-106c. The switch 104 maps logical storage space presented to the server 102 to actual storage space on the storage systems 106a-106c. The storage space on the storage systems 106a-106c for any contiguous logical volume may or may not be contiguous. In addition, the storage space for any contiguous logical volume may or may not span more than one of the storage systems 106a-106c. For any logical volume, each of the servers 102a-102n is presented with a contiguous storage space irrespective of the mapping by the switch to the storage systems 106a-106c.

The switch 104 may allow for dynamic remapping of logical volumes presented to the servers 102a-102n during operation so that the remapping is somewhat transparent to the servers 102a-102n. Thus, for example, logical storage space x1-x2 may be initially mapped to storage space y1-y2 on the storage systems 106a-106c and then may be remapped during operation to storage space y3-y4 on the storage systems 106a-106c. This remapping may occur many times. In addition, remapping may cause previously contiguous mapped space on the storage systems 106a-106c to become noncontiguous or cause previously noncontiguous mapped space on the storage systems 106a-106c to become contiguous. For example, logical storage space x1-x2 may be initially mapped to storage space y1-y2 on the storage systems 106a-106c and may be remapped so that logical storage space x1-x1a is mapped to storage space y3-y4 on the storage systems 106a-106c while logical storage space x1a-x2 is remapped to storage space y5-y6 on the storage systems 106a-106c, where y3-y4 is not contiguous to y5-y6. After the remapping, the logical storage space x1-x2 appears contiguous to one of more of the servers 102a-102n even though the space x1-x2 is mapped to noncontiguous spaces on the storage systems 106a-106c.

It should be noted that the servers 102a-102n may correspond to one or more of the hosts previously described in connection with FIGS. 1 and 2. Additionally, an embodiment may include a different number of one or more hosts functioning as servers than as shown in FIG. 4A.

Figure 4B:
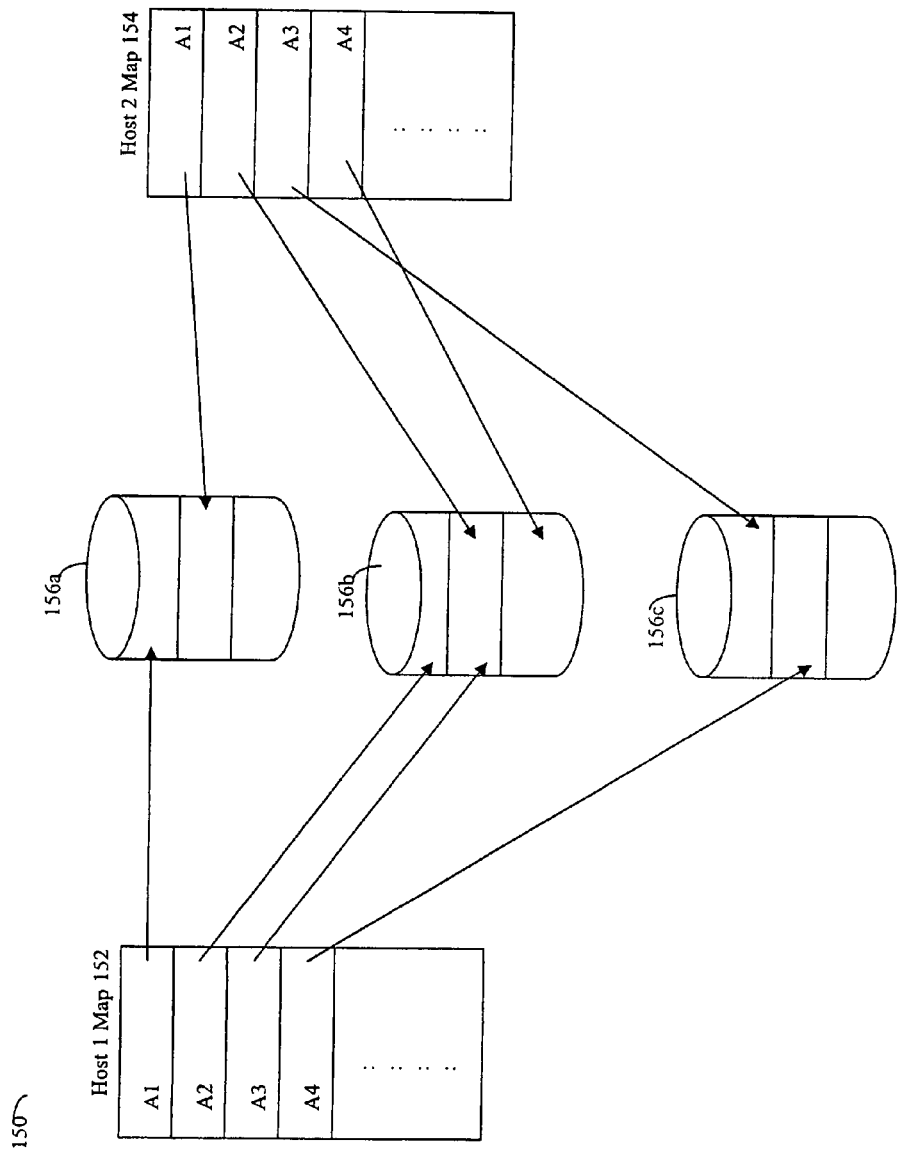
FIG. 4B is an example illustrating how the switch maps the primary storage in accordance with each host or server's point of view of the storage.

Referring now to FIG. 4B, shown is an example 150 of how the switch may be used in connection with representing the physical storage in accordance with the view point of a particular host. In the example 150, included are two maps 152 and 154. Map 152 may be used in representing the storage devices 156a-156c to a first host. Map 154 may be used in representing the storage devices 156a-156c to a second different host. The mapping may be performed using functionality included within an embodiment of the switch such that the hosts can communicate directly with the switch and have the data representing in accordance from the perspective of each host. It should be noted that the components and functionality for representing the physical storage in accordance with the view of a particular host may be extended to other embodiments and variations as will be appreciated by one of ordinary skill in the art, for example, as described in pending U.S. patent application Ser. No. 09/608,521, filed on Jun. 30, 2000. In the example 150, each of the maps includes locations identified as A1, A2, and the like. Each of these locations may correspond, for example, to a logical unit or volume, or other element referenced by a host.

Figure 5:
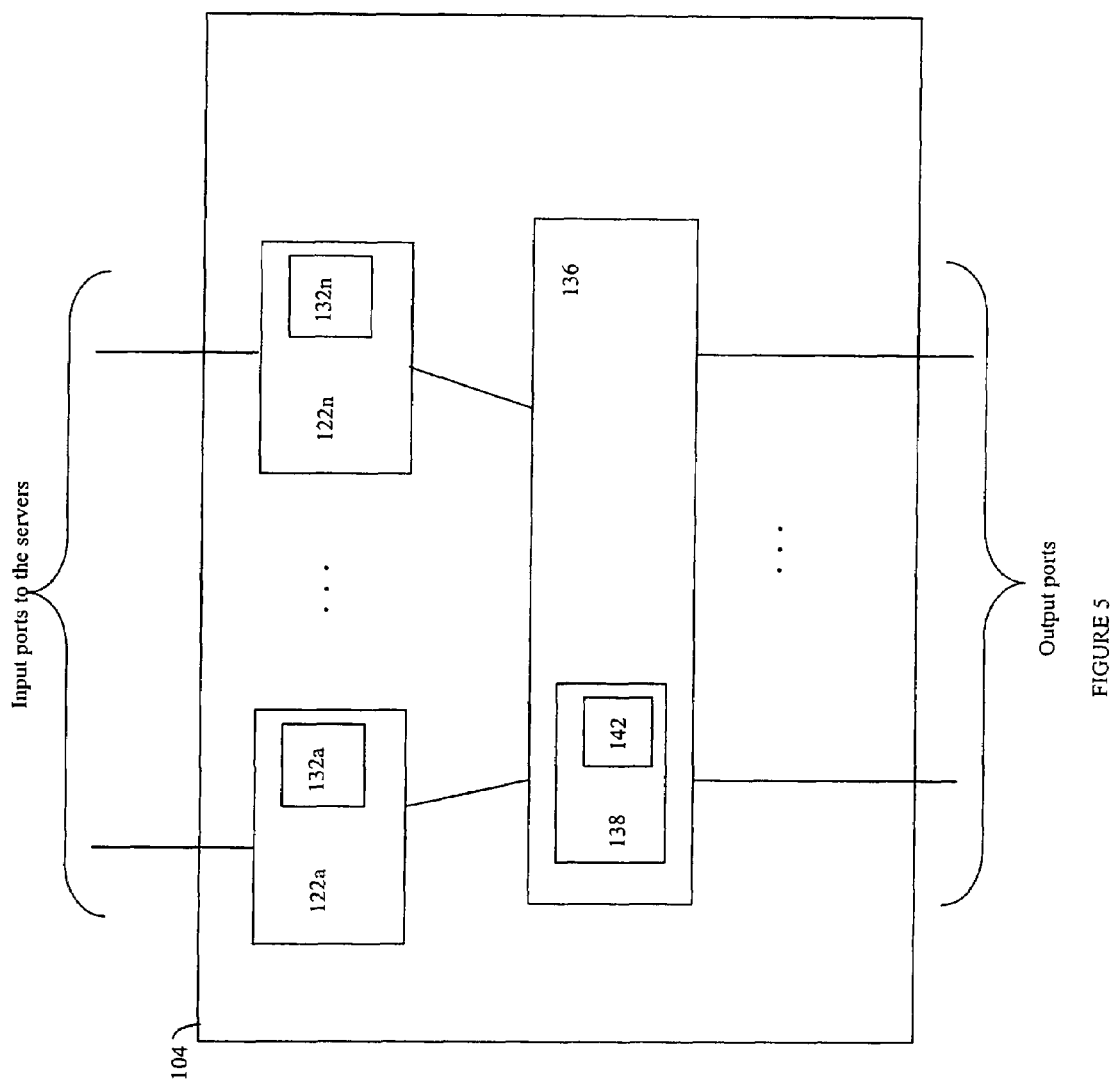
FIG. 5 is an example of an embodiment of a switch included in FIG. 4A.

Referring now to FIG. 5, an embodiment of the switch 104 is shown in more detail where each of a plurality of input ports for the switch 104 has one of a plurality of local processor boards 122a-122n. Each of the processor boards 122a-122n includes a respective on-board memory 132a-132n for local data storage thereon. Each of the processor boards 122a-122n is coupled to a switch backplane 136, that handles routing of data and connections between the input ports and the output ports of the switch 104. The switch backplane 136 may be controlled by a backplane processor board 138 which includes memory 142. In some embodiments, the memory 142 is local to the processor board 138. In other embodiments, the memory 142 is global and thus accessible to one or more of the processor boards 122a-122n.

It should be noted that although FIG. 5 illustrates a single processor board associated with each port, an embodiment may also include other variations. For example, an embodiment may have multiple ports associated with a single one of processor boards 122a-122n.

The switch backplane 136 acts as a multiplexer that makes connections between the ports according to configuration information provided by the backplane processor board 138. In some embodiments, the memory 142 contains a switching table that controls mappings between input and output ports according to specific addresses provided at the input ports. The switch 104 may be implemented using off-the-shelf hardware provided by companies such as Brocade and Cisco.

An output port may be associated with each of the data storage systems or other components that may be coupled to the servers via the switch 104. In one embodiment, the switch may couple the servers to one or more primary data storage systems, and one or more other data storage systems used to store a backup copy of the one or more primary data storage systems.

Figure 6:
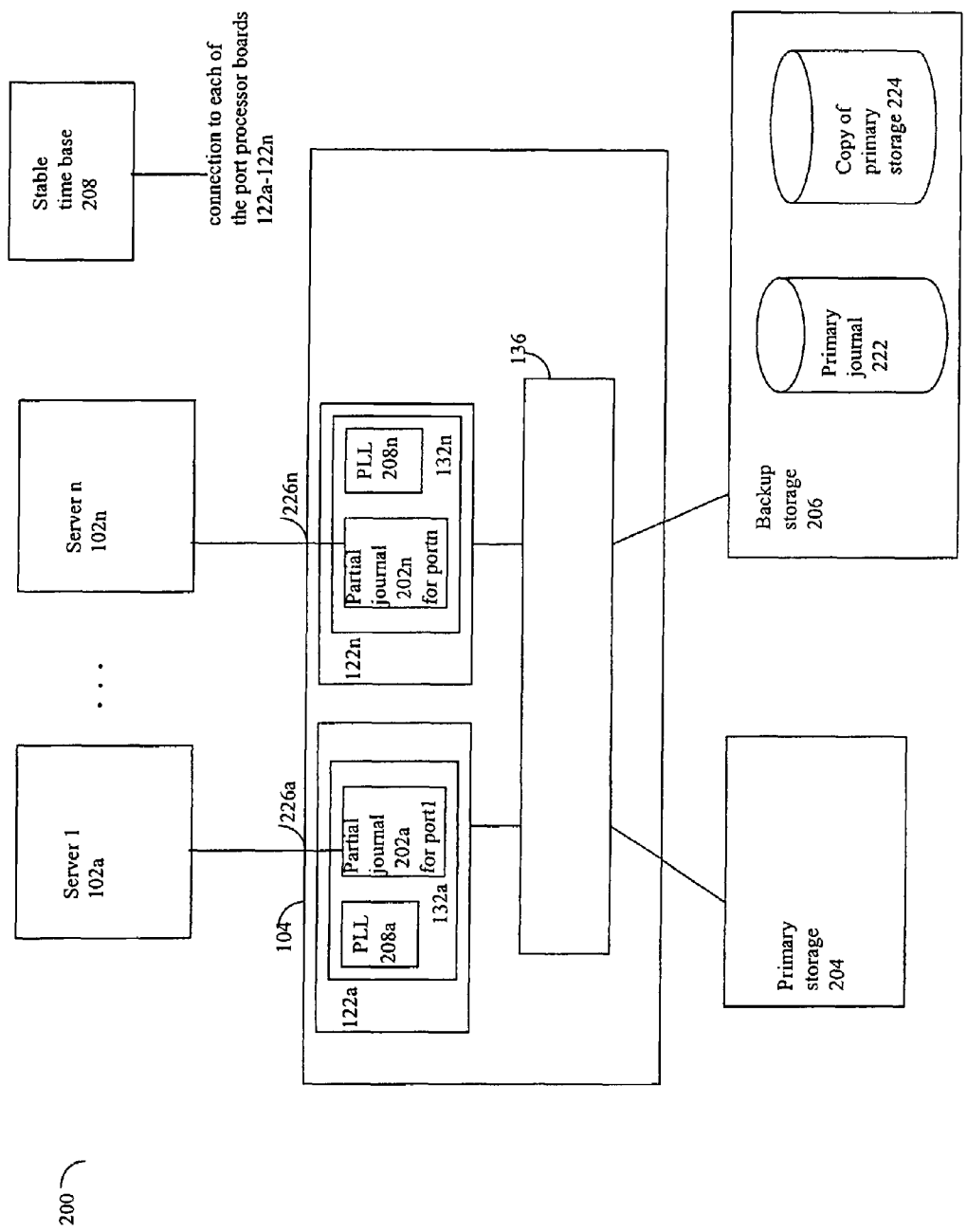
FIG. 6 is an example of an embodiment of a system of FIG. 1 shown in more detail.

Referring now to FIG. 6, shown is an example of an embodiment 200 of components that may be included in a system providing for continuous data backup. It should be noted that the components included in 200 may be characterized as a more detailed description of components that may be included in an embodiment of the system 10 previously described in connection with FIG. 1. The components of 200 include servers 102a through 102n, a stable time base 208, a switch 104, a primary storage 204 and a backup storage 206. Each of the servers 102a through 102n is described elsewhere herein in more detail. Similarly, components within the embodiment of the switch 104 are also described elsewhere herein.

The embodiment 200 includes additional detail regarding components within the switch 104 as related to performing a continuous data backup technique described herein. It should be noted that other components may be included in a system than as shown herein. The particular components and details included in FIG. 6 are for the purpose of illustrating the techniques of continuous data backup.

The primary storage 204 may correspond to one or more data storage systems or devices included therein as described elsewhere herein connected to the switch 104. Similarly, the backup storage 206 may correspond to one or more data storage systems or devices included therein as described elsewhere herein. The primary storage 204 in this example is used for storing the actual data or a primary copy of the data. Data modifications, such as by an application executing on one or more of the servers 102a-102n, are performed to the data included in the primary storage. The backup storage 206 in this example is used in connection with storing a backup copy of the primary storage 204 with respect to a particular point-in-time copy of the primary storage 204. Described in following paragraphs are different techniques that may be used in connection with maintaining a backup copy of the data in primary storage, and restoring data therefrom.

In connection with a distributed journaling technique described in following paragraphs, each of the servers is associated with a particular port. Associated with each of the ports as illustrated within the switch 104 is a processor having an associated portion of memory. For example, associated with a first port is processor board 122a that includes a portion of memory 132a. In this embodiment, the partial journal for the first port is denoted as 202a and may be stored within the memory 132a of the first port. The partial journal 202a may be used in logging journal entries associated with the first port 226a. Additionally, included within the memory 132a of the processor board 122a is phase lock loop or PLL component 208a. As described in more detail elsewhere herein, the PLL component 208a may be used in maintaining a stable time for the first port. A time stamp may be produced using the stable time and included in an entry for the partial journal 202a. The PLL component 208a may be implemented using hardware and/or software using techniques known to those of ordinary skill in the art. It should be noted that the processor associated with each port may execute instructions in connection with performing other tasks described herein, such as the mapping and remapping of storage in accordance with a point of view of each of the servers 102a-102n, performing logging or journaling operations in connection with a write operation, and the like.

It should also be noted that the time values used herein by each of the processors do not need to be synchronized with an outside time source. An embodiment may also synchronize the times of each of the processors relative to one another without referencing an external time source as described and illustrated herein.

Included in 200 is a stable time base or source 208 having connections to each of the port processing boards 122a through 122n. The stable time base 208 may broadcast at regular intervals an updated time value. This broadcast time value may be received by each of the processor boards 122a through 122n and communicated to the PLL components which use this actual time value in maintaining an accurate time value that is synchronized among the different processor boards 122a through 122n. The PLL component 208a may maintain this time value as a piece of state information used in connection with the log or journal entries included in the partial journal for a particular port.

In one embodiment, the stable time base 208 may broadcast a time value which is in milliseconds in order to obtain an accurate time value in microseconds as maintained for a time stamp value used in connection with journaling. Other embodiments may use different units than as described herein. It should be noted that in maintaining a time value used in journaling in one embodiment, the PLL component does not make backward time adjustments in accordance with synchronizing its time value with broadcasted time values. Rather, the PLL component may make adjustments to its maintained time value to correspond to the stable time base time value by moving time forward. The stable time base broadcasts a time value at regular intervals at which the PLL component may make appropriate adjustments. As known to those of ordinary skill in the art, the PLL techniques may be used for time synchronization to provide for a synchronized time value as used by each of the port processor boards. The stable time base 208 may be any one of a variety of different components used in generating an accurate time value within the tolerance limits of a particular system. In one embodiment, the time synchronization of the partial journals is maintained within one I/O response time period. Other embodiments may have other thresholds and tolerances associated with maintaining time synchronization as used by each of the partial journals.

In operation, each of the servers may perform a write operation to the primary storage 204. Each of the write operations is received at the switch 104 through one of the ports 226a-226n and is journaled in a partial journal corresponding to the particular port. For example, a write operation from server 102a is received at the switch 104 on input port 226a. The write operation is journaled in partial journal 202a. Each entry within the partial journals includes a time stamp value as determined by the PLL component of that respective port.

At various points in time, one or more of the partial journals may be written out to a primary journal 222 included in the backup storage 206. It should be noted as will be described elsewhere herein, applying one or more entries in the primary journal 222 to the copy of the primary storage 224 may be used in reconstructing an instance of the primary storage 204. Additionally, this reconstruction may be represented to a particular server with respect to its point of view of the storage. When performing a write operation in one embodiment, the write operation is actually performed to the primary storage 204 after journaling the write to the partial journal of a particular input port.

The copy of the primary storage 224 may be characterized as a copy or snapshot of the primary storage 204 at a first point in time. Write operations as logged in the primary journal 222 and/or the partial journals 202a-202n are made with respect to this first point-in-time copy of the data. Journal entries are stored in the partial journals and may be propagated at a later time to the primary journal 222. In the event that the switch 104 is unavailable or otherwise goes offline, the primary storage 204 may be reconstructed with respect to those operations having journal entries within the primary journal 222. It should be noted that this may not result in an actual up to date replication of the primary storage area 204 since those journal entries included in each of the partial journals of the switch 104 may be lost. The backup copy of the data may be obtained using the copy 224 and that information which is maintained by the primary journal 222. It should also be noted that an embodiment may cache the partial journals 202a-n, or portions thereof, elsewhere within the system 200. Caching the partial journals may be desirable in the event of a switch 104 failure to reduce the amount of data journaling that is lost. In this instance, the primary storage 204 may be reconstructed using the copy 224, the primary journal 222, and any cached portions of the partial journals from within the switch 104. In an embodiment, the partial journals for the primary storage 204 may be cached in a portion of the primary storage 204 or other storage included in 200 that is not affected in the event that switch 104 goes offline.

It should be noted that each of the partial journals associated with each of the input ports may be pushed periodically to the primary journal 222. In one embodiment, the partial journal associated with a particular input port may flush in the event that the partial journal is filled. This may be done in an automated fashion when the partial journals reach capacity. Thus, each of the partial journals may be emptied independent of the other partial journals in accordance with the capacity and rate at which each of the partial journals fills up with entries. An embodiment may also provide a technique for flushing each of the partial journals in accordance with a command that may be issued on a periodic basis. The journals may be flushed, for example, at predetermined intervals in addition to when each of the partial journals fills up or reaches capacity. Other embodiments may use other techniques in connection with causing the data within one or more of the partial journals to be propagated to, and included within, the primary journal 222 of the backup storage 206.

Figure 7:
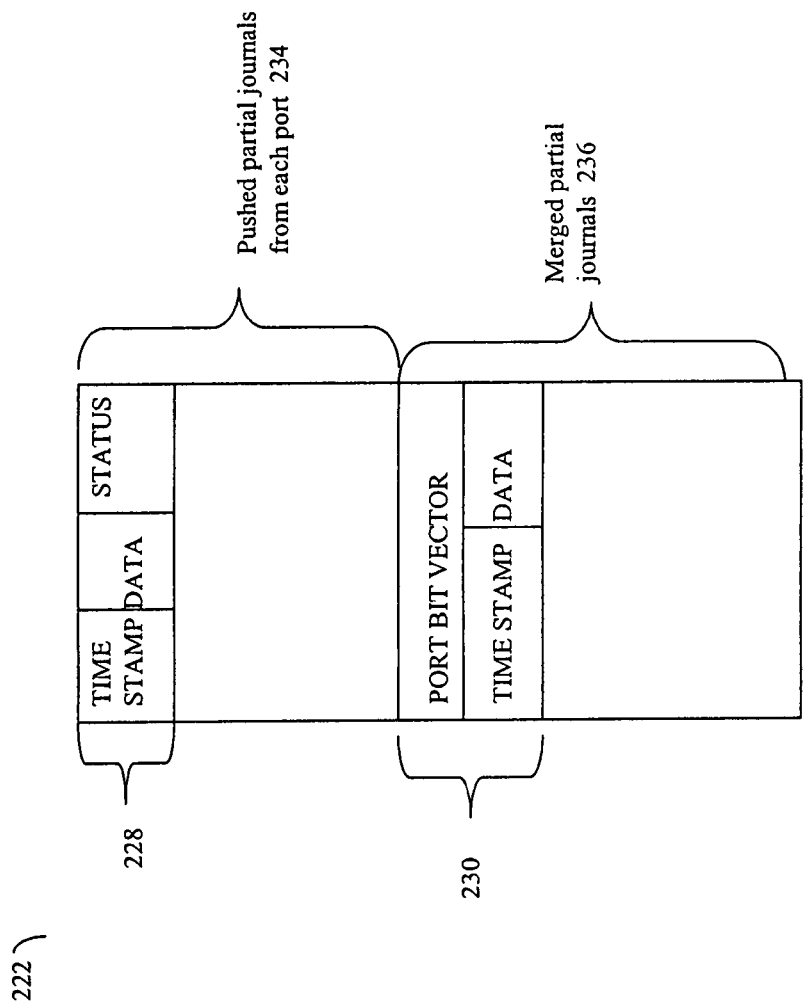
FIG. 7 is an example of a format of a primary journal.

Referring now to FIG. 7, shown is an example 222 of an embodiment of the primary journal in more detail. In this representation 222 of FIG. 7, the primary journal 222 may include a portion 234 and a portion 236. Included in portion 234 are the pushed partial journals associated with each port. Included in 236 are those partial journal entries which have gone through a merging process. A single record within the merged partial journals portion 236 may represent one or more partial journal entries which have been combined with respect to a particular point in time. At various points in time, a merging process may be executed on the backup storage system 206 which searches for all of the partial journal entries in 234 within a predetermined time period. The merge process may combine the one or more journal entries representing one or more write operations as applied to each respective data portion into a single entry included in the merged partial journal entries 236. For example, within a predetermined time period, one or more hosts may write or modify the same portions of data. Subsequently, a merge process searches for all the partial journal entries included in 234 which modify a same portion of data for the predetermined time period. For this predetermined time period, the merge process applies data modifications or writes in the proper time order and produces as an output a single merged partial journal entry 230 included in portion 236 of the primary journal 222.

In one embodiment, each of the partial journals may include one or more partial journal entries of the format 228. Each partial journal entry 228, as may be pushed from each of the partial journals 202a through 202n, includes a time stamp, an updated data value, and a status value. In this embodiment, a write operation with respect to a particular data portion of the primary storage 204 can be characterized as a three phase write operation. In a first phase or step, the time and updated version of the data is written to a journal entry included in a partial journal file. The actual data is then written out to the primary storage. Subsequently, a status field included in the journal entry reflects the status of both the write to the journal and the write to the primary storage. The status value may indicate, for example, whether both the journal logging and the write to the primary storage has been successful or not. In one embodiment, a failure may be indicated, for example, if either the writing to the journal or the write to the primary storage is not successful. It should be noted that the time values included in each of the partial journal entries may correspond to a time value at the initiation or start of a write operation.

It should be noted that an embodiment may use the format of 228 included in 222 as the format of the partial journal entries included in each of 202a-202n of FIG. 6. Included in 228 and 230 formats is a data field which, in one embodiment, refers to the address of the location affected by the write operation as well as the data to be written to that address.

In one embodiment, a process may also execute on the backup storage running as a periodic background process which copies or otherwise obtains the partial journals from every port on a periodic basis. Within each of the partial journals, the partial journal entries are maintained in a time order sequence. When the process executing on the backup storage system obtains the partial journals from each of the ports, all the partial journal entries are stored in time order sequence in section 234 based on the time stamp of each entry. Merged partial journal entries included in 236 are also in a time ordered sequence. Different techniques that may be used in connection with merging the partial journals at various journal or synchronization points are known to those of ordinary skill in the art.

If the background process executing on the backup storage 206 which obtains or requests a partial journal from each of the ports detects that a particular port has not responded with its partial journal within a particular predetermined time period, any information coming from that port may be suspect such that the validity or status of the partial journal entry may be questioned. If the background process obtaining each of the partial journals detects that a particular port has not responded within the predetermined time period, the process may conclude that the unresponsive port is offline or otherwise unavailable. From this point on, the process may ignore any partial journal entries coming from that port until that port's status has been corrected since the partial journal data coming from the port may be invalid.

An embodiment may perform any one of a variety of different techniques when an unresponsive port has been detected or a particular port has otherwise been characterized as generating invalid partial journal data. The background process may continue and the merge process may also continue ignoring any partial journal entries from that particular partial journal after the suspect point in time. The primary data source or storage area of 204 may be resynchronized with a copy of the primary storage 224 applying those merged and partial log entries (up to the suspect or other point in time) from the primary journal 222 known to be valid. Subsequently, using the resynchronized copy of primary storage 224, partial journal entries may again be accepted from each of the ports and the previously suspected bad port may be rebooted or otherwise restarted in order to resume normal partial journaling operations.

Referring again to FIG. 7, a merged partial journal entry 230 in portion 236 of the primary journal may include a port bit vector, a time stamp value, and an updated data value. As described elsewhere herein, a merging process may search for one or more corresponding entries in the partial journal entry 234 with respect to a particular portion of the physical or primary storage. These one or more write operations with respect to the same address are merged and applied such that the data included in 230 reflects the current point in time copy of the data at a particular address as specified in accordance with the time stamp also included in 230. In one embodiment, the port bit vector may include a bit entry for each of the port identifiers included in the switch. The port bit vector may include a bit entry which is a boolean value, for example, set to one (1) if the data from this port for the time period associated with the merged entry is valid, and a zero (0) otherwise.

In the event that it is desirable or necessary to restore the primary storage 204 such as, for example, in the event of a primary storage data corruption, a recovery or restoration process may reconstruct a copy of the primary storage using the primary journal 222, the partial journals 202a-202n, and the copy of the primary storage 224. The reconstruction may be made with respect to particular point-in-time, for example, by applying those journal entries relevant for a specified time period to the copy of the primary storage 224. As part of the restoration process, the partial journals may be merged to form merged journal entries. Alternatively, the recovery process may be performed using the partial journal entries without first forming additional merged journal entries. The merged journal entries having a port bit vector indicating that all the partial journal data from all the ports is valid may be used. In reconstructing a copy of the primary data, an embodiment may not apply those journal entries after a point in time associated with merged journal entry indicating that not all port partial journal data is valid. It should be noted that techniques in connection with performing a data restoration using the merged journal entries are known to those of ordinary skill in the art.

The recovery or restoration processing may be included within an appliance and may be located in any one of a variety of different locations within the embodiment of the system and components 200. For example, such an appliance may be included in the switch or other location within a system other than within the primary storage.

It should be noted that as described elsewhere herein, each of the partial journals may not be considered protected data and may be stored in volatile storage within the switch 104. Consequently, as also described elsewhere herein, if the switch goes down or is otherwise unavailable, a restoration of the primary storage 204 can only be reconstructed from what is included in the main or primary journal 222. An embodiment may accordingly select a partial journal flush frequency or time interval in accordance with the risk of data loss versus the overhead incurred in downloading data to the primary journal. The frequency with which the partial journal are flushed, the overhead associate therewith, and the tolerance for the risk of data loss with respect to the primary storage may vary in accordance with each embodiment.

The data restoration processing described herein may be performed by an appliance. Once a point-in-time copy of the primary storage 204 is reconstructed, this copy may then be committed to the primary storage 204.

It should be noted that the primary journal 234 may be compressed on a periodic basis using techniques known to those of ordinary skill in the art. The primary journal 222 may be compressed, for example, after a predetermined time period, such as on a weekly basis or other time period. An embodiment may also choose to apply these changes to the copy of the primary storage 224, or store the compressed data modifications as one or more journal entries in the primary journal 222. The particulars associated with different compression processing may vary in accordance with each embodiment.

Figure 8:
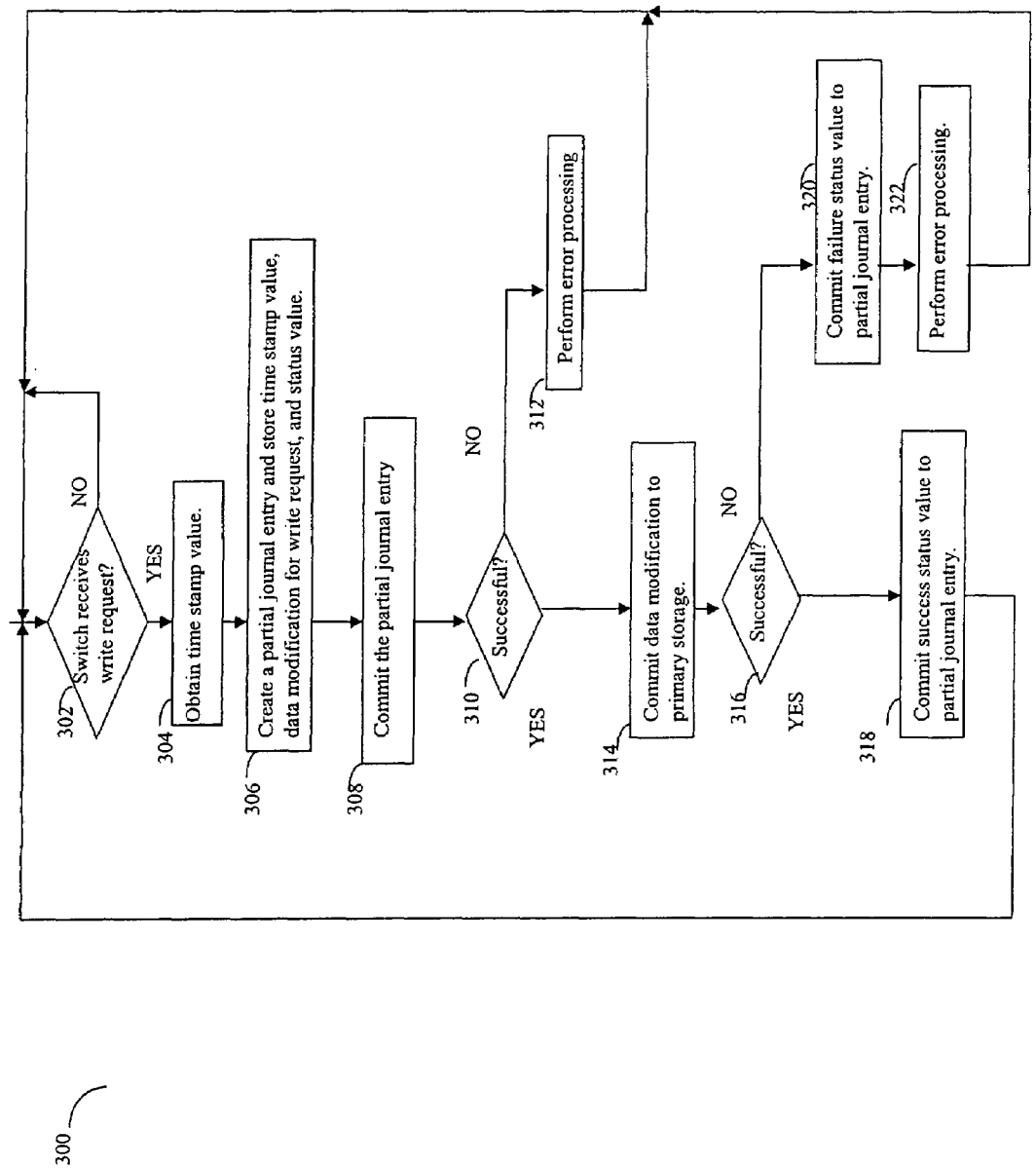
FIG. 8 is a flowchart of processing steps of a first technique for journaling write requests.

Referring now to FIG. 8, shown is a flowchart 300 of processing steps that may be performed in one embodiment by components within the switch 104. The steps of flowchart 300 summarize processing steps described above and may be performed by each of the processors associated with each of the ports included in an embodiment of the switch 104 as described above in connection with processing a write request received from one of the servers. At step 302, a determination is made as to whether the switch has received a write request from a particular input port. If not, control proceeds back to step 302 until a write request has been received on the particular input port. Once a write request has been received, control proceeds to step 304 where a time stamp value is obtained. The time stamp value in one embodiment is the time at which the incoming write request was received. At step 306, a partial journal entry is created for the write request. The time stamp value and the data modification for the write request are stored within the newly created partial journal entry within the partial journal associated with the input port upon which the request was received. A status value may also be stored in this entry reflective of the partial journal entry commit operation attempted in step 308. At step 308, an attempt is made to commit the partial journal entry to the partial journal associated with the input port. At step 310, a determination is made as to whether the data operation at step 308 has been successful. If not, control proceeds to step 312 where error processing may be performed. It should be noted that the particular error processing performed in an embodiment at step 312 may vary in accordance with the particular embodiment. For example, an embodiment may choose to not proceed any further with trying to process the particular write request in the event that the commit at step 308 has failed. Subsequently, after step 312, control proceeds back to step 302 to wait for the next write request. In connection with performing error processing at step 312, an embodiment may also perform processing steps, for example, involving possible corrective measures to ensure that future writes to the partial journal do not fail. This particular processing may be performed in response to the particular error message or failure status received.

At step 310, if the commit of the partial journal entry at step 308 has been successful, control proceeds to step 314 where the data modifications as indicated in the received write request are committed to primary storage. At step 316, a determination is made as to whether the commit operation at step 314 has been successful. If not, control proceeds to step 320 to update status value of the current partial journal entry to indicate the failure of step 314. At step 322, additional error processing may be performed and control may proceed to step 302 to wait for the next incoming write request.

If, at step 316, it has been determined that the commit of the data operations to the primary storage in connection with the write request has been successful, control proceeds to step 318 where accordingly the partial journal entry may have its status value updated to indicate success of the commit operation at step 314. Subsequently, control proceeds from step 318 to step 302 to process the next incoming write request.

Figure 9:
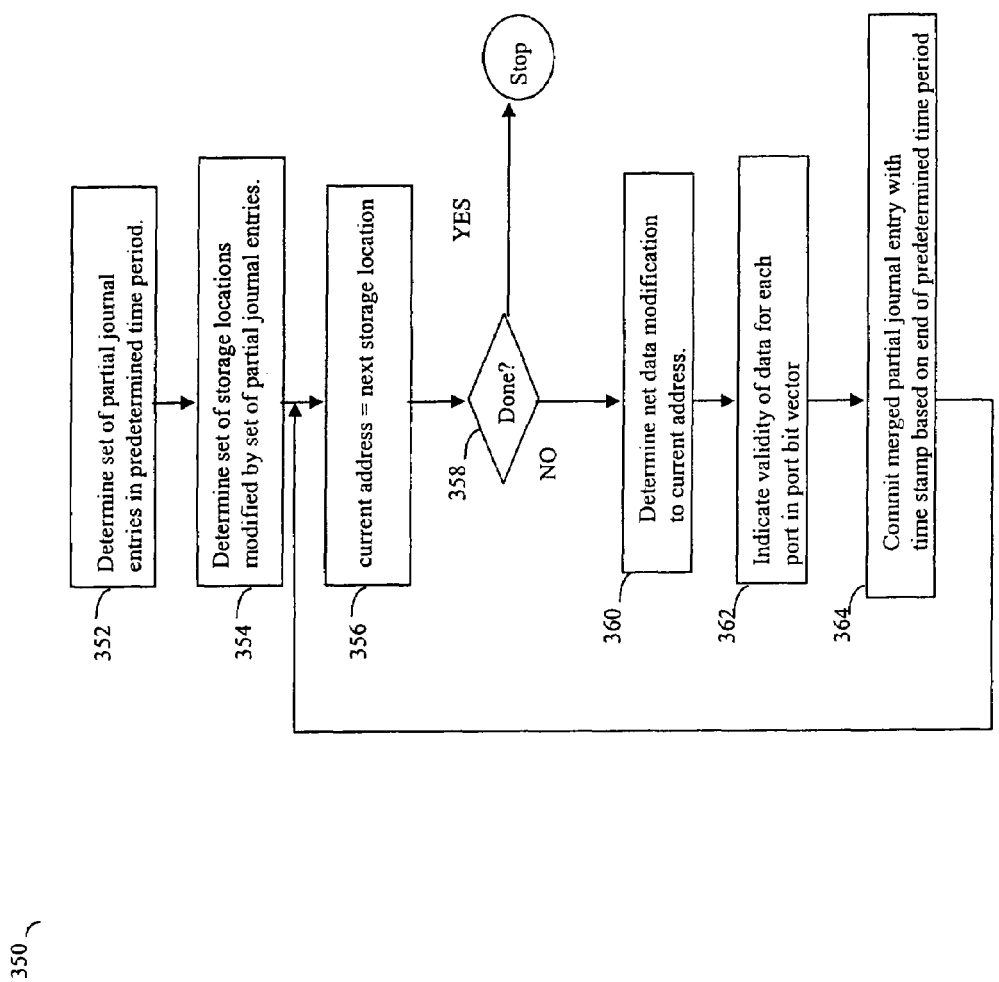
FIG. 9 is a flowchart of processing steps that may be performed in connection with forming merged partial journal entries.

Referring now to FIG. 9, shown is a flowchart 350 of processing steps that may be performed in an embodiment in connection with merging partial journal entries within the primary or main journal 222. The processing steps of flowchart 350 may be performed, for example, in forming one or more merged partial journal entries in section 236 in which each of the merged partial journal entries in 236 corresponds to one or more partial journal entries included in portion 234 of the primary journal 222.

The processing steps of flowchart 350 may be used in connection with forming one or more merged partial journal entries in 226 for a predetermined time period. Within an embodiment, a merger or compression time factor may be used. This merger or compression time factor may be used to define a window of time, the predetermined time period. The partial journal entries within this predetermined time period may be compressed into a single merged entry in section 236 for each modified storage location. At step 352, the set of one or more partial journal entries within a predetermined time period in portion 234 are determined. At step 354, the one or more storage locations modified by the set of journal entries from step 352 are determined. At step 356, current address is assigned the next storage location. The loop formed with a beginning step of 356 iterates through all of the different storage locations determined in step 354 and creates a merged journal entry corresponding to each location. At step 358, a determination is made as to whether processing is complete for all of the storage locations from the set determined at step 354. If so, processing stops. Otherwise, control proceeds to step 360 where the net data modification to the current address or storage location is determined. In other words, at step 360, if there have been multiple writes to the same storage location, the most recent data modification in time is determined to be the current value for that particular current address. At step 362, the validity of the data with respect to each port is determined and stored in a port bit vector that will be included in a later processing step in the merged partial journal entry included in 226. In connection with determining the validity of each port as related to the partial journal entries for each port, state information may be maintained within the backup storage 206. This state information may include a bit or boolean value which is set to zero when data associated with a particular port is deemed to be invalid. Associated with this invalid bit value is a time stamp as to when this invalidity determination is made. For the particular invalid port and associated time stamp value, any partial journal entry received from that invalid port subsequent to that time stamp value may be considered invalid or suspect, and ignored, for example, in connection with performing the processing steps of flowchart 350. In one embodiment, the particular invalid port and associated time stamp values may be used in determining the set of partial journal entries examined and formed at step 352 such that, if a particular port is indicated as invalid and the time stamp value of this invalidity is within the predetermined time period, the partial journal entries for this invalid port may not be included in the set resulting from step 352. At step 364, the merged partial journal entry is created and committed in section 236 of the primary journal 222. This merged partial journal entry may include a time stamp value in accordance with the end of the predetermined time period or window. Subsequently, control proceeds to step 356 where processing continues with the next storage location until all of the storage locations have been processed.

It should be noted that determining validity of the partial journal entries associated with a particular port may be determined using any one or more of a variety of techniques. In one embodiment, a process may periodically execute on a backup storage to request or otherwise obtain the partial journal entries from each of the ports within the switch 104. This process may determine that a particular port contains invalid data if it has not responded with partial journal data within a predetermined amount of time. It should be noted that this may be just one way in which an invalid state of a port may be determined or detected in an embodiment. Other techniques known to those of ordinary skill in the art may be used in connection with determining an invalid port status which may accordingly invalidate subsequently received partial journal entries associated with that port. It should also be noted that an embodiment may reset or reinitialize the invalid state associated with a particular port should the status of that particular port return to a valid state. The port may be returned to a valid state, for example, if a particular problem, such as with a communication medium, has been corrected.

The merged partial journal entries included in portion 236 of the primary journal 222 may be used in connection with any one of a variety of well known recovery or restoration techniques to produce a point-in-time copy of the primary storage 204.

Figure 10:
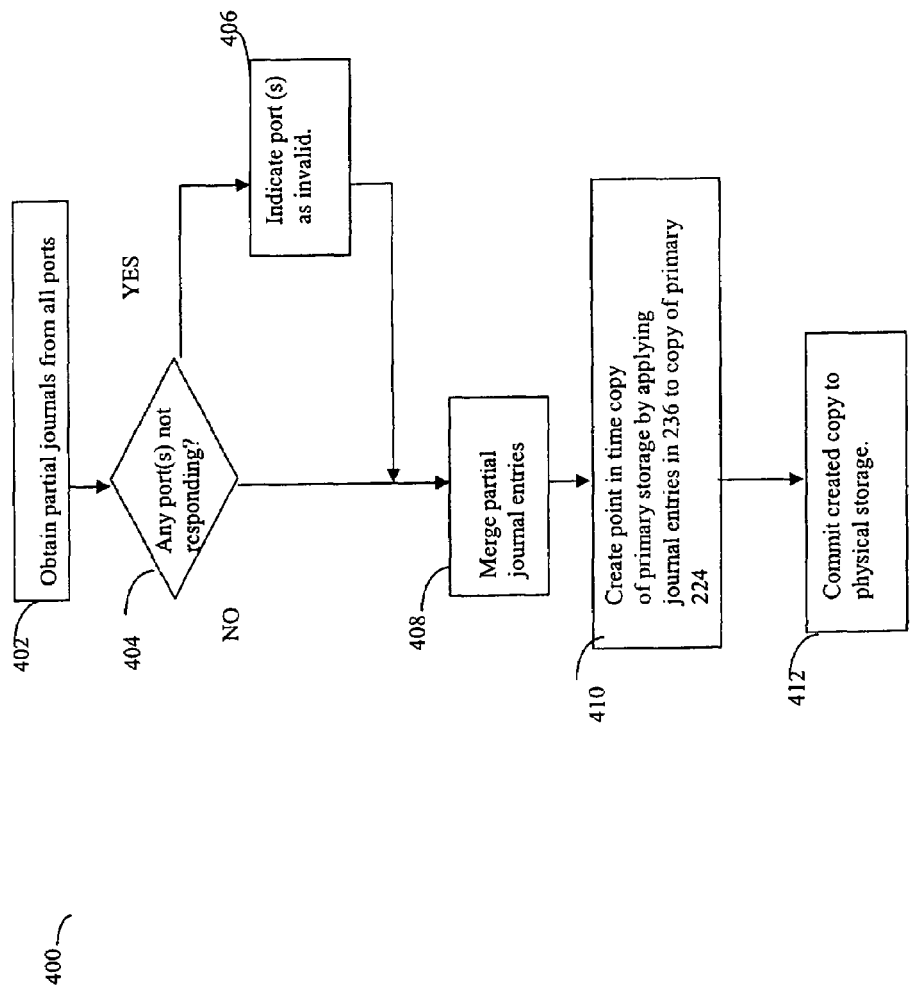
FIG. 10 is a flowchart of processing steps that may be performed in connection with creating a point-in-time copy of a primary storage.

Referring now to FIG. 10, shown is a flowchart 400 of processing steps that may be performed in an embodiment in connection with performing a data restoration of the primary storage 204. The processing steps of flowchart 400 may be performed, for example, in the event that the primary storage 204 has been corrupted. The processing steps of flowchart 400 may also be performed, for example, in connection with reconstructing the primary storage 204 with respect to a particular point in time for other purposes as may be appreciated by those of ordinary skill in the art. At step 402, the partial journals are obtained from all of the ports. At step 404, a determination is made as to whether any one or more of the ports have not responded with its partial journal. If so, the particular ports that have not responded may be determined as invalid and indicated at step 406 as invalid with a particular time stamp according to a current time value. This time value may be obtained, for example, from the PLL component described elsewhere herein. The particular invalid port number and its associated invalid time stamp value may be stored as part of state information described elsewhere herein and used in connection with performing other processing steps. Control proceeds to step 408 where partial journal entries included in portion 234 of the primary journal are merged. The merging process may be performed, for example, using processing steps of flowchart 350 as described elsewhere herein in connection with FIG. 9. An embodiment may use other techniques in connection with forming merged partial journal entries which are included in portion 236 of the primary journal 222. At step 410, a point-in-time a copy of the primary storage is restored using the journal entries in 236 as applied to a copy of the primary storage 224. It should be noted that any one of a variety of different well known techniques known to those of ordinary skill in the art may be used in creating this restoration copy of the primary storage produced as a result of step 410 processing. At step 412, the restored copy of the primary storage generated at step 410 may be committed to the primary storage 204. Alternatively, the copy of the primary storage created as a result of step 410 may also be restored to another data storage system or device in connection with other purposes and applications that may vary in accordance with each particular embodiment.

In addition to the option of restoring changes to another data storage system, a virtual presentation of the data can be created and presented via a logical unit offering a time-consistent view of data without additional write operations.

It should be noted that the write of a journal entry to the partial journal may happen concurrently in an embodiment with the writing of data to the primary storage. Alternatively, an embodiment may perform sequential operations rather than concurrent operations as just described. The foregoing technique, may be used to provide advantages when performing write operations by reducing contention for the main journal since journal entries are written at each of the different input port points in a distributed fashion which may be aggregated at various points in time into a main or primary log. The foregoing technique also utilizes a copy of the primary storage in connection with maintaining and performing a backup of the primary storage.

What will now be described is another technique that may be referred to as a distributed copy on write technique which does not require a copy of the primary volume in connection with providing a continuous data backup. The second technique may utilize the distributed journaling approach as described elsewhere herein. For example, an embodiment utilizing the distributed copy on write technique that will be described in more detail in following paragraphs may be illustrated using the system 200 of FIG. 6 with the elimination of the element 224 from the backup storage 206. The format of the journal entries for both the primary journal and the partial journals may be as described previously in connection with the first technique. For example, the main or primary journal previously described in connection with FIG. 7 may also be used in connection with the copy on write technique.

In connection with performing the copy on write technique, when a write request is received on one of the input ports, the current value of the data prior to applying the data modification for the write request is copied into the partial log with a time stamp corresponding to the write request. In order to have a partial log of the existing data contents of the physical storage prior to the write request requires performing a read of the data prior to performing the write request. In effect, a read operation is inserted into the processing when performing a write request where the read operation reads the old data from the primary storage, stores it in the log or journal, and subsequently writes out the modified data to the physical storage in accordance with the write request received. Using this technique, the amount of storage required when performing a restoration or backup may be minimized in that a copy of the primary storage is not required to be maintained. However, the extra read operation performed prior to executing a write request adds significant latency in connection with performing a write operation.

Figure 11:
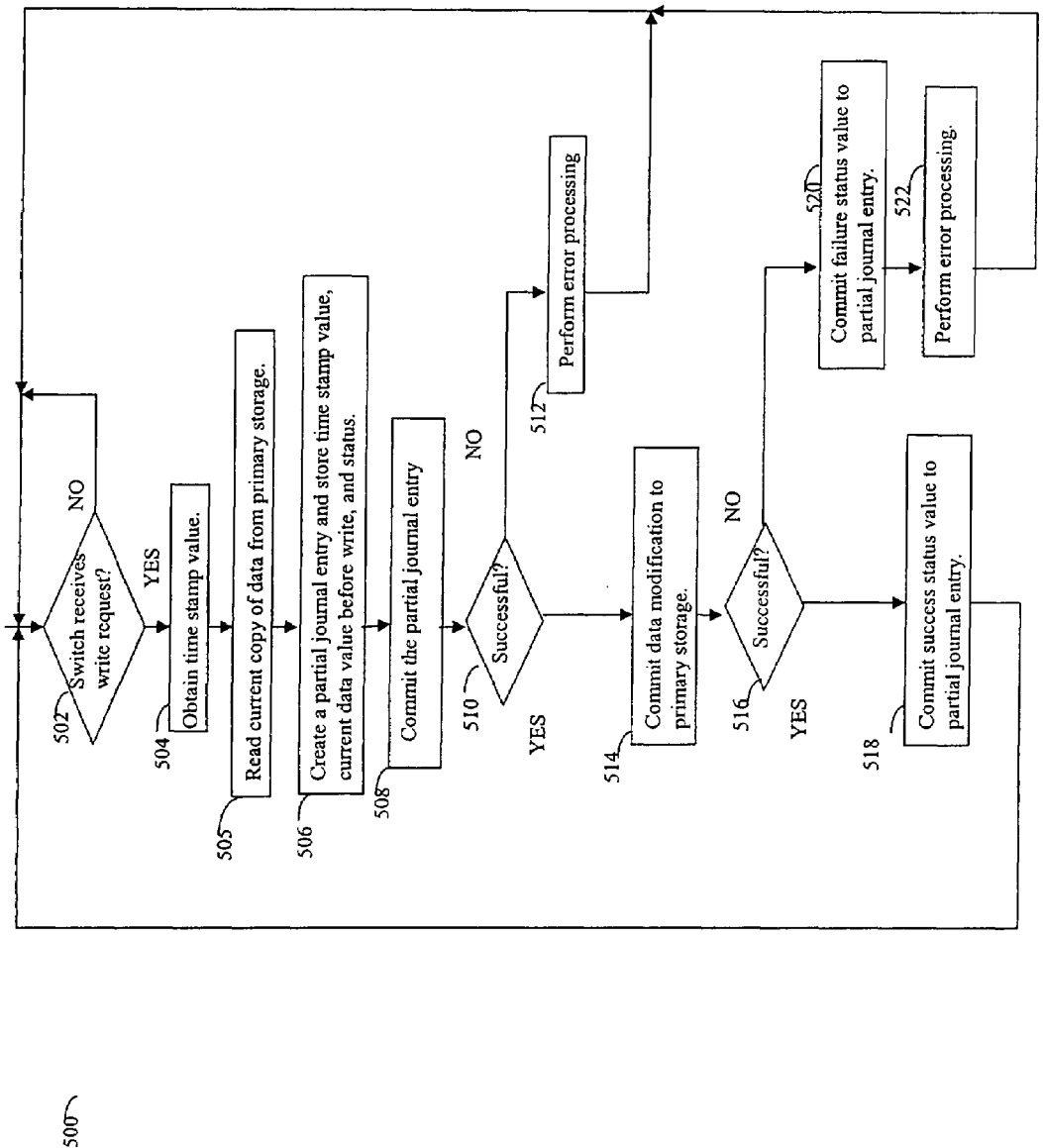
FIG. 11 is a flowchart of processing steps of a second technique for journaling write requests.

Referring now to FIG. 11, shown is a flowchart 500 of processing steps that may be performed in system utilizing the copy on write technique. It should be noted that many of the steps of the flowchart 500 are similar to those as described previously in connection with flowchart 300 of FIG. 8. It should be noted that each of the processors within the switch that are associated with a port may perform the processing steps of the flowchart 500. At step 502, a determination is made as to whether the switch has received a write request. If not, control proceeds to step 502 to wait until such a write request has been received at a particular input port. Once a write request has been received, control proceeds to step 504 where a current time stamp value is obtained. As described elsewhere herein, this time stamp value for a particular processor associated with an input port may be obtained, for example, using its corresponding PLL component. Control proceeds to step 505 where a copy of the data is read from the primary storage. The data location or address is that of the particular location to be updated in connection with the write request received at step 502. At step 506, a partial journal entry is created which includes the time stamp value, current data value before the write, and a status value corresponding to the status of a successful partial journal entry commit. For example, the status value may indicate success such that in the event that subsequent commit of this partial journal entry is successful, the corresponding status value and the partial journal entry will properly reflect this status. At step 508, an attempt is made to commit the partial journal entry just created at step 506. At step 510, a determination is made as to whether that commit of the partial journal entry has been successful. If not, control proceeds to step 512 to perform error processing and then subsequently returns to step 502 to wait until the next write request is received.

In the event that the partial journal entry commit has been successful, control proceeds to step 514 where the data modifications in connection with the write request are committed to primary storage. At step 516, a determination is made as to whether this commit to the primary storage has been successful. If not, control proceeds to step 520 where a commit failure status value is entered into the partial journal entry, and error processing is performed at step 522. Subsequently, control proceeds from step 522 to step 502 to wait for the next write request to be received. At step 516, in the event that the data modification commit operation to primary storage has been successful, control proceeds to step 518 to commit a success status value to the partial journal entry which now reflects a status of both the data storage commit operation and the partial journal entry commit operation. Subsequently, control proceeds to step 502 to wait for the next write request to be received.

What will now be described is an example of how the distributed copy on write journal may be used in connection with creating a point-in-time view of the primary storage. Creation or reconstruction of a point-in-time copy of the primary storage may be used, for example, in connection with restoring the state of the primary storage if the primary storage has been corrupted. Additionally, the technique of reconstruction may be used in connection with other purposes as also described elsewhere herein.

Figure 12:
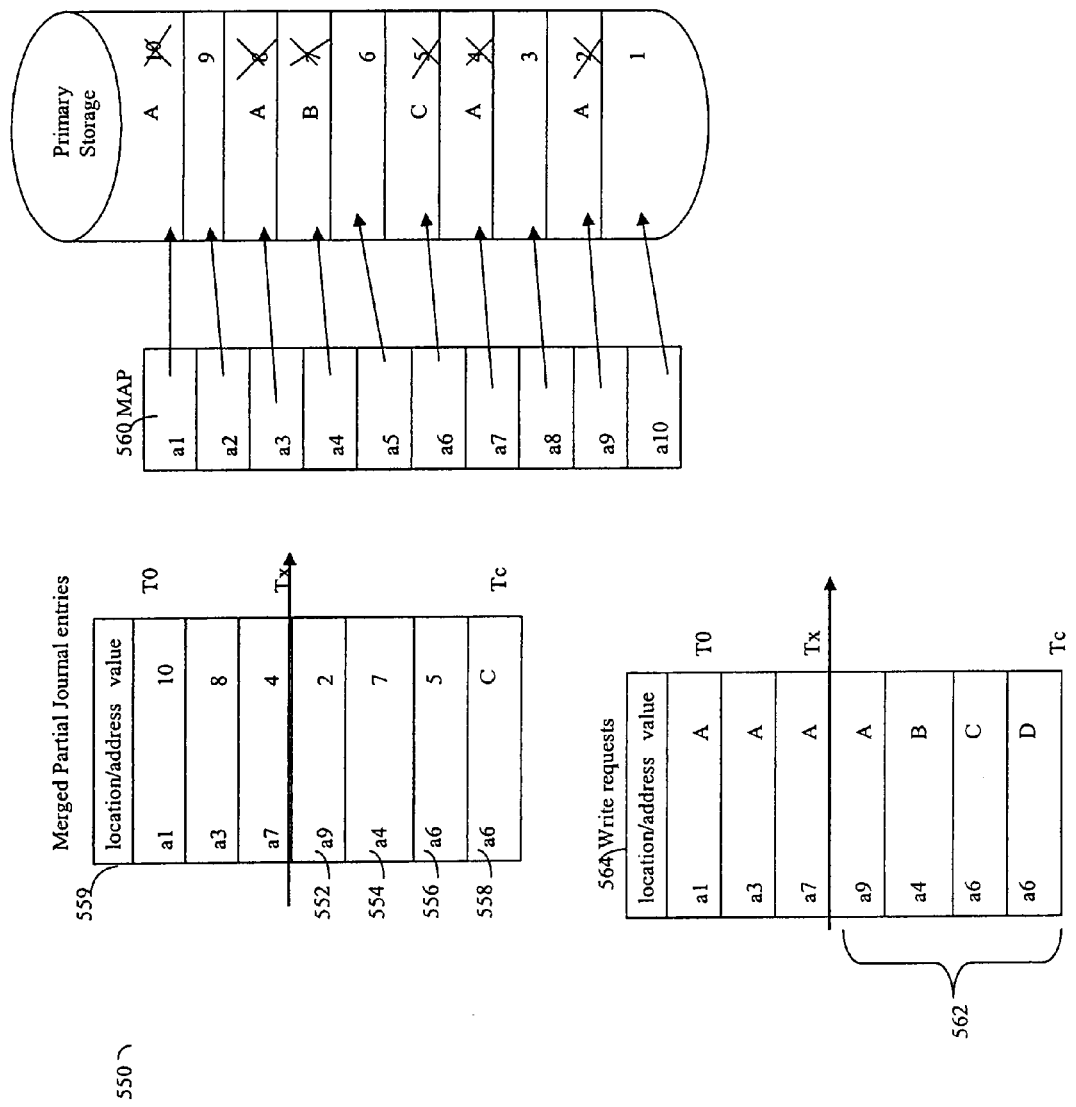
FIGS. 12 and 13 are examples illustrating the second technique.

Referring now to FIG. 12, shown is an example 550 illustrating the use of the distributed copy on write journal in creation of a point-in-time view of a primary storage volume. The illustration 550 includes merged partial journal entries 559, a map 560 pointing into primary storage, and a table 564 identifying a time ordered sequence of write requests that have been performed corresponding to the particular merged partial journal entries. It should be noted that in this example, it is assumed that the partial journal entries have already been merged producing a representation in the table 559 as may be included in an embodiment of the main or primary journal. The table 559 indicates journal entries performed in a time order from time T0 to time Tc where time T0 is the initial time point corresponding to a particular snapshot or state of a primary storage volume. Partial journal entries are made with respect to the state of the primary storage at time $T_0$ through time Tc which is the current time value. Corresponding write requests that have caused a partial journal entry to be made in table 559 are indicated in table 564. For the purposes of illustration, a simplified system may be assumed where each of the write requests may come from a single port such that the merged partial journal entries in table 559 correspond to the partial journal entries themselves. It should also be noted that although the illustration 550 includes a table of merged partial journal entries 559, the techniques described herein in connection with restoration may also be performed using the unmerged partial journal entries. With respect to the example 550, a request has been made to create a point-in-time view from a distributed copy on write journal as indicated by table 559 with respect to time Tx. In other words, even though additional write requests have occurred between time Tx and Tc, a process, as may be included in an appliance within the switching fabric, has requested that the primary storage be reconstructed including only those write requests processed through time Tx and ignoring those write requests issued after time Tx until time Tc. With reference to 550, the reconstruction request with respect to a point-in-time view of Tx is equivalent to ignoring those write requests included in portion 562 of table 564. The information included in the example 550 may be characterized as a snapshot of the state of different pieces of information within a system utilizing the copy on write technique.

It should be noted that fields from each of the journal entries and other elements may omitted from 550 for the purposes of simplicity to illustrate the restoration technique.

As a first step, a map is created which is a list of pointers initially all pointing to portions within the primary volume. The map 560 may be that map used in representing the primary storage in a particular point of view to a host or server system as described elsewhere herein. In connection with this restoration process, each of the locations a1 through a10 included in the map initially points to that data value which is in primary storage. It should be noted that in an embodiment, the map 560 may be initialized to point to other locations within the primary storage other than as illustrated 550. The particular mapping of a location, such as a1, to a particular portion of the primary storage may vary in accordance with a particular point of view of the application. Subsequently, the journal entries in 559 are scanned in a time order from time Tx to the current time Tc. For each journal entry after time Tx up to and including time Tc, if the corresponding location of that journal entry has a corresponding map pointer in table 560 that points to the primary volume, then that map pointer is adjusted to point to the actual data value included in table 559 rather than point to that current data value which is stored in the primary storage.

After the journal entries up to time Tc have been processed, the map 560 contains pointers into the primary storage for that data that has not been modified since time Tx, and includes pointers to data values in journal entries for those data portions that have been modified since time Tx. Once this reconstruction process has been performed, any subsequent writes to the journal 559 may also be handled. In one embodiment, for every subsequent journal entry written to 559 after the reconstruction process has been performed, if the map pointer for a particular location of a log entry is still pointing to the primary storage, then the block pointer corresponding to that particular location is replaced by a pointer to the journal data.

Figure 13:
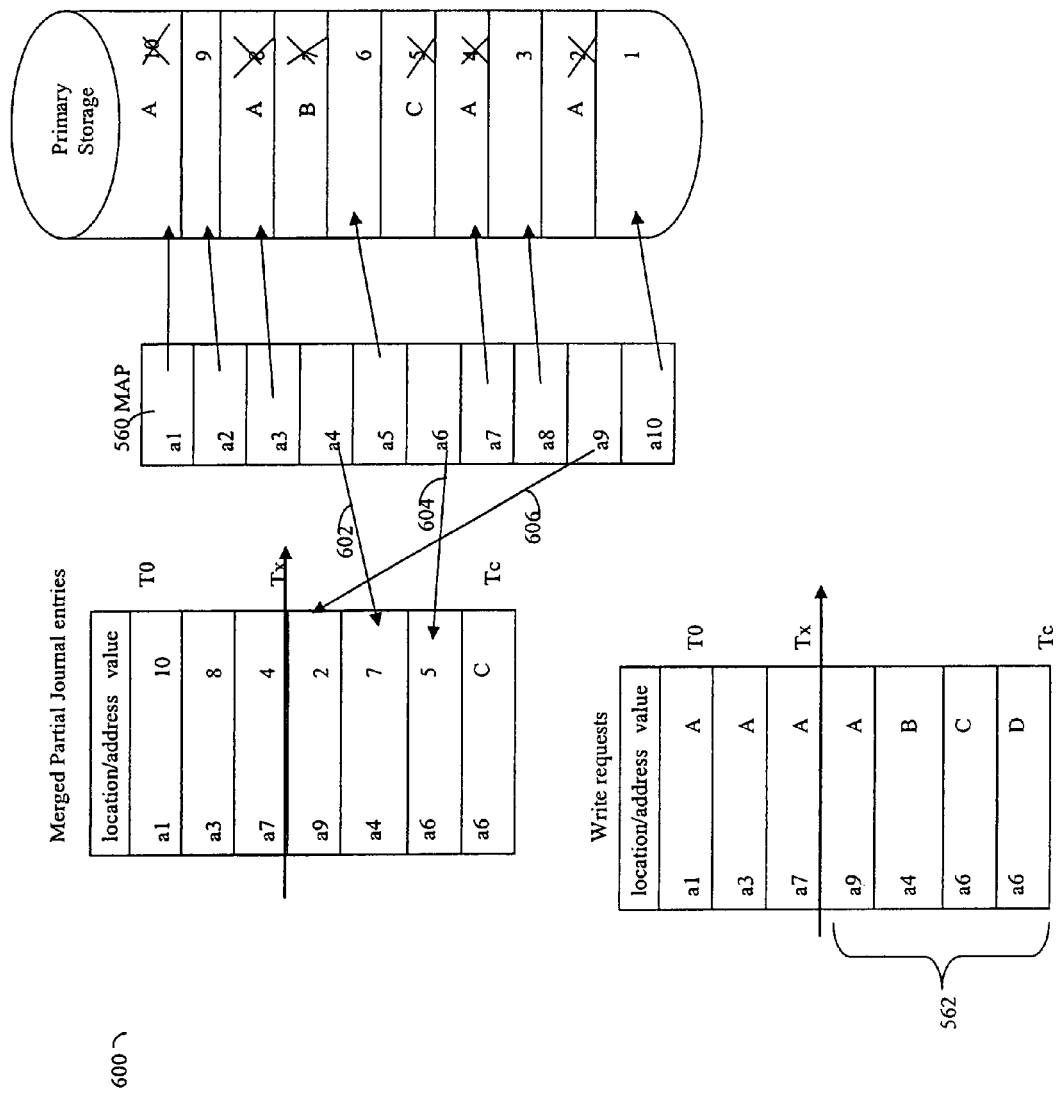

Referring now to FIG. 13, shown is an after snapshot of that information reflected in example 550 which has been updated after the foregoing restoration processing steps have been performed. In other words, map 560 within the example 600 represents the map for a point-in-time copy of the primary storage for time Tx in which data journaling is performed using the copy on write technique described herein.

Figure 14:
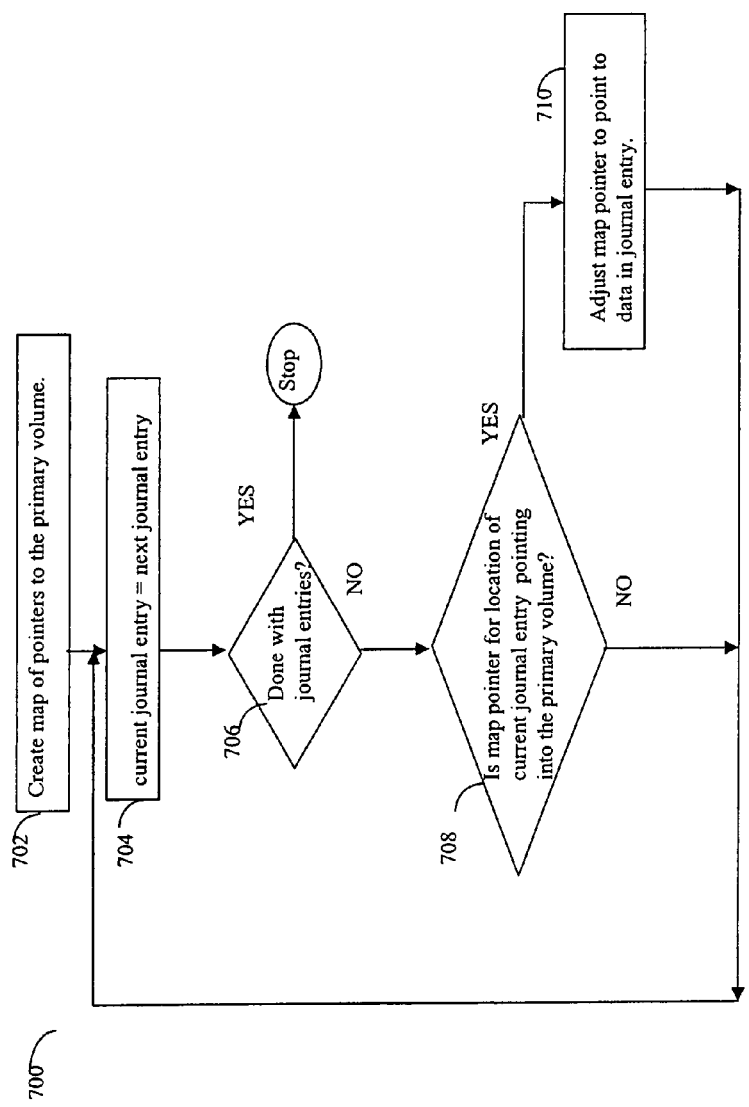
FIGS. 14 and 15 are flowcharts of processing steps that may be performed in an embodiment for creating a point-in-time copy of a primary storage using a journal created with the second technique.

Referring now to FIG. 14, shown is a flowchart 700 of processing steps summarizing the creation of a point-in-time view from a distributed copy on write journal just described and illustrated in connection with preceding figures. At step 702, a map of pointers is created initially all pointing to locations in the primary volume. This map in step 702 may be constructed with respect to a particular point-in-time view or mapping of the application or process making the reconstruction request. At step 704, each of the journal entries from Tx to Tc are scanned one at a time. The first such entry is examined at step 704 on the first iteration. At step 706, a determination is made as to whether all of the journal entries have been processed. If so, processing stops. Otherwise, control proceeds to step 708 where a determination is made as to whether the map pointer for the location of the current journal entry is pointing to a data value in the primary volume. If so, control proceeds to step 710 where the map pointer is adjusted to point to the data in the journal entry rather than point to a current value with respect to time Tc located within the primary storage. Otherwise, at step 708, if it is determined that the map pointer for the location of the current journal entry does not point into the primary volume, control proceeds to step 704 to examine the next journal entry. Subsequent to step 710 processing, control once again also proceeds to step 704 to examine the next journal entry. Processing continues until all journal entries have been examined between time Tx up to the current time Tc.

Figure 15:
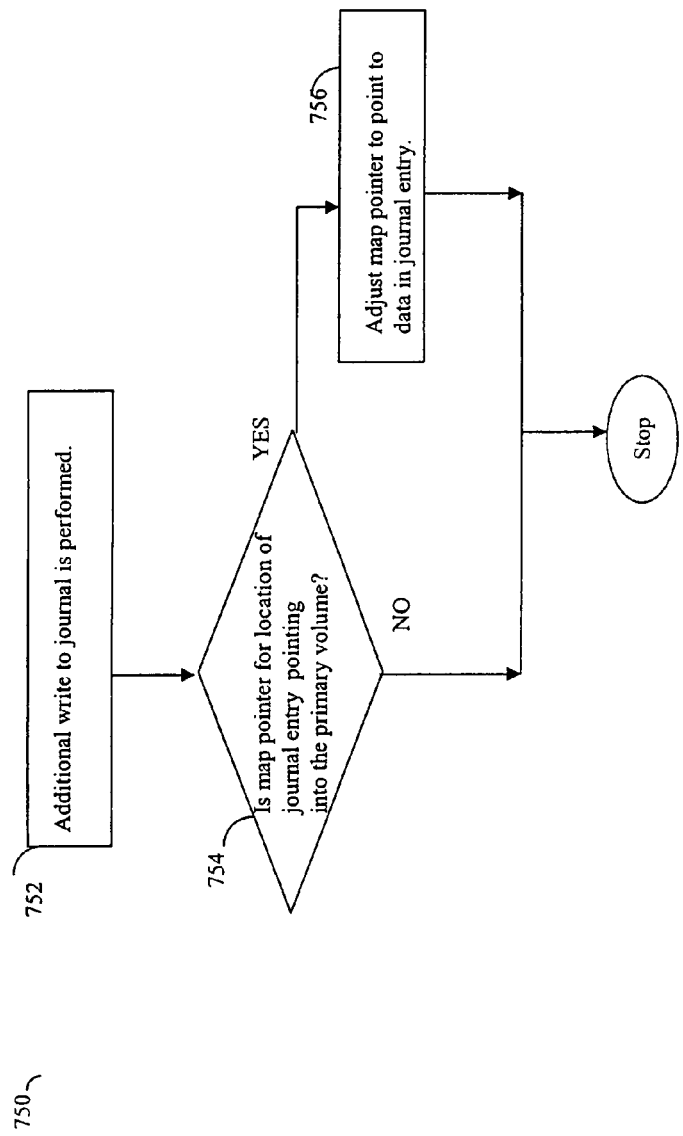

As described above, it is possible for additional writes to occur to the primary storage after a point-in-time view of the primary log is reconstructed with respect to time Tx. In this instance, the processing steps of flowchart 750 of FIG. 15 may be performed to accurately represent the point-in-time view with any additional journal entries made after time Tc. At step 752, the additional write is performed to the journal. At step 754, the corresponding journal entry is examined and a determination is made as to whether the map pointer for the location of the journal entry is pointing into the primary volume or storage. If so, control proceeds to step 756 where the map pointer is adjusted to point to data in the journal entry just created at step 752. If, at step 754, the determination is that the map pointer for the current journal entry location does not point into the primary volume, processing stops.

Figure 16:
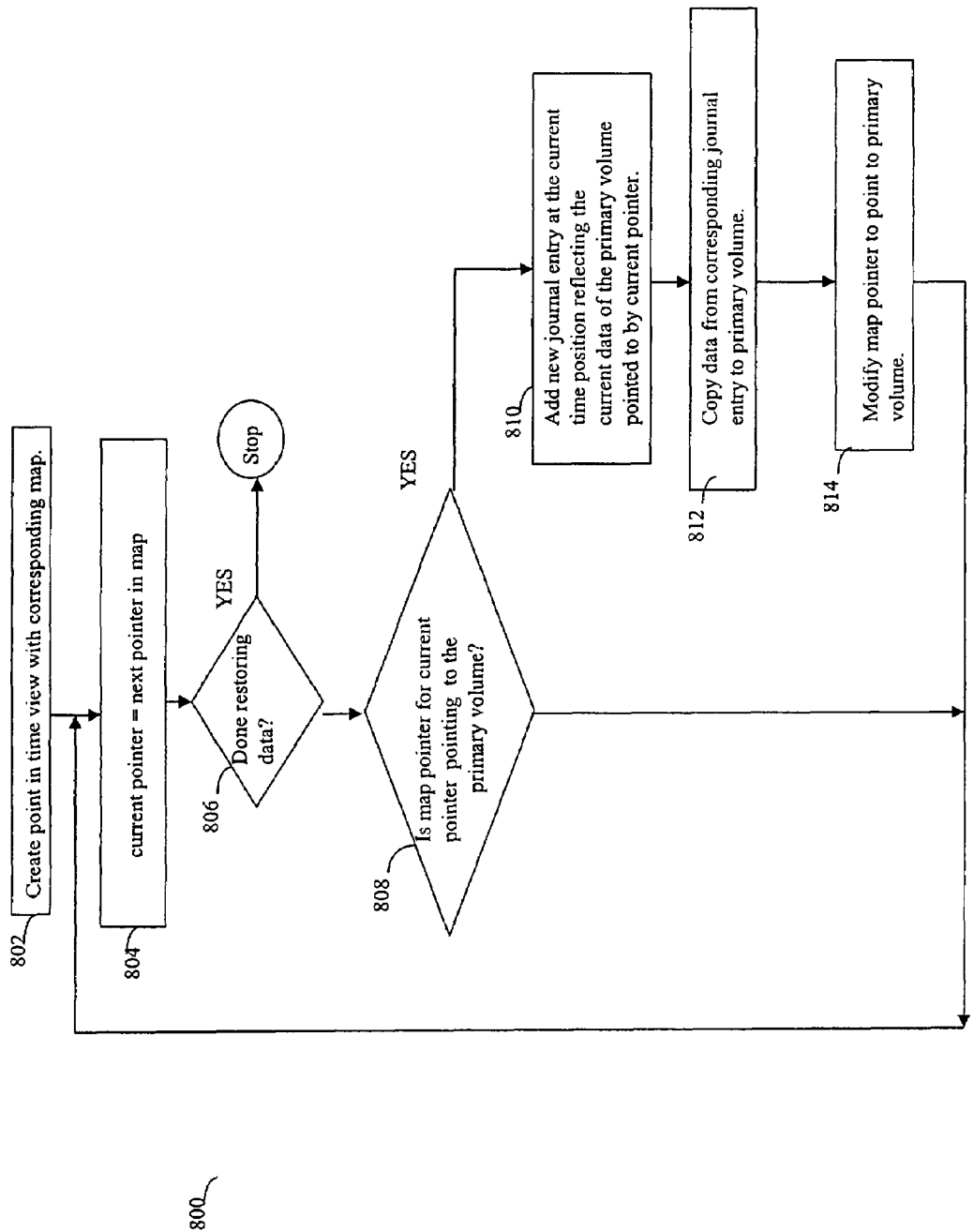
FIG. 16 is a flowchart of processing steps that may be performed in restoring to primary storage the point-in-time copy created using the second technique.

In connection with creating a point-in-time view as just described, it may be desirable to restore the data to the primary volume or storage from the point-in-time copy of time Tx just created. This may be performed, for example, in connection with a data restoration operation in which the primary storage has been corrupted or otherwise determined to be invalid. It should be noted that as described elsewhere herein, the processing steps of flowchart 800 of FIG. 16 may be used in connection with other uses and applications that may vary in accordance with each embodiment and this particular example should not be construed as a limitation. The flowchart 800 includes a first step 802 which creates a point-in-time view of the primary storage with a corresponding map. Processing step 802 produces a map that may also be produced by executing the processing steps of flowchart 700 and 750 just described. Subsequently, each entry within this map is scanned by examining each entry in step 804. At step 806, a determination is made as to whether the data restoration has been completed. If so, processing stops. Otherwise, control proceeds to step 808 where a determination is made as to whether the map pointer for the current pointer points into the primary volume or storage. If so, control proceeds to step 810 where a new journal entry may be made at the current time position within the journal reflecting the current data of the primary volume as pointed to by the current pointer. It should be noted that step 810 may be optionally performed in an embodiment, for example, if an embodiment wishes to also log or journal the data restoration process itself. At step 812, the data is copied from the corresponding journal entry to the primary volume. At step 814, the map pointer for the current pointer is modified to point to the primary volume. Control then proceeds to step 804 to examine the next pointer within the map. Step 804 looks at the next consecutive pointer value in table 560 for the next location. If at step 808 it is determined that the map pointer for the current pointer does not point to the primary value or storage, control proceeds to step 804 directly.

The flowchart 800 processing steps provide for restoring the primary volume to include those data values as reflected in the storage at a previous time Tx. In the event that a write request has modified a portion of the primary volume between time Tx and Tc, the map would point to an entry within the journal. Accordingly, in updating or restoring the primary volume to a particular state at any time such as Tx, in the event that the data value at time Tx is within the journal, the primary storage is updated at step 812 to include that actual data value from the journal to the primary volume. Subsequently, the map 560 corresponding to a particular point-in-time view representation may have a map pointer adjusted to now to point to the primary volume which has been restored.

While the invention has been disclosed in connection with various embodiments, modifications thereon will be readily apparent to those skilled in the art. Accordingly, the spirit and scope of the invention is set forth in the following claims.

What is claimed is:

1. A method for journaling operations modifying a primary storage, the method comprising:
   receiving a write request to modify data at a location in said primary storage; and
   journaling said write request in one of a plurality of partial journals, wherein each of said plurality of partial journals is emptied to a primary journal including one or more partial journal entries and one or more merged partial journal entries, each of the merged partial journal entries representing application of one or more data modifications for a time period to a location in primary storage.

2. The method of claim 1, wherein each of said one or more partial journal entries includes a time stamp associated with a write request.

3. The method of claim 1, further comprising:
   periodically flushing said plurality of partial journals to said primary journal, wherein contents of each of said plurality of partial journals are included in said primary journal when said each partial journal is filled in accordance with a predetermined capacity level.

4. The method of claim 1, wherein each of said plurality of partial journals is associated with an input port in a switch and includes journal entries for all write requests received on said associated input port.

5. The method of claim 4, wherein each of the merged partial journal entries includes an indicator indicating the validity of journal entries received from each input port in accordance with a time stamp value associated with said each merged partial journal entry.

6. The method of claim 1, further comprising:
   updating said primary storage in accordance with said write request, and wherein each partial journal entry includes a status indicator reflecting a status of both said journaling and said updating.

7. A computer readable medium comprising code stored thereon for journaling write requests writing data to a primary storage, the computer readable medium comprising code for:
   receiving a write request requesting to write data to a location in primary storage;
   receiving a copy of data at said location on said primary storage; and
   journaling said write request in one of a plurality of partial journals in a partial journal entry including said copy prior to performing said write request, wherein each of said plurality of partial journals is emptied to a primary journal including partial journal entries and merged partial journal entries, each of the merged partial journal entries representing application of one or more write requests for a time period to a storage location.

8. The computer readable medium of claim 7, wherein each of said partial journal entries in said plurality of partial journals has an associated time stamp value, said partial journal entries being ordered in accordance with associated time stamp values.

9. The computer readable medium of claim 8, further comprising code for:

merging a portion of said partial journal entries for a predetermined time period for write requests to a storage location producing a merged partial journal entry for said storage location.

10. The computer readable medium of claim 9, wherein a backup copy of said primary storage with respect to a point in time equal to or less than a current time value is produced using said plurality of partial journals and said primary storage without maintaining a copy of said primary storage.

11. A method of creating a point-in-time copy of a primary storage comprising:

receiving journal entries corresponding to write requests, said journal entries being in a time order in accordance with said write requests, each of said journal entries including a data value for a location in said primary storage before performing one of said write requests;

receiving a plurality of map entries wherein each of said plurality of map entries is associated with a location identifier corresponding to a location in said primary storage; and performing, for each of said journal entries including a location identifier and a data value prior to performing a write request, processing including:

determining an entry in said plurality of map entries having a same location identifier as that of said each journal entry; and if said entry in said plurality of map entries maps to a data value in the primary storage, adjusting said entry in said plurality of map entries to map to said data value in said each journal entry.

12. The method of claim 11, wherein each entry in said map received in said receiving step initially maps to a value included in said primary storage.

13. The method of claim 11, wherein said primary storage includes one or more logical devices.

14. The method of claim 11, wherein said primary storage includes a plurality of devices from a plurality of data storage systems.

15. The method of claim 11, wherein the journal entries include merged partial journal entries from a plurality of partial journals, each of the merged partial journal entries representing application of one or more data modification for a time period to a location in said primary storage.

16. The method of claim 11, further comprising:

receiving a request to create said point-in-time copy of said primary storage with respect to a time Tx, wherein at least one additional write request has occurred after time Tx until a current time Tc; and examining journal entries associated with times beginning with the time Tx through the current time Tc, wherein said performing uses only journal entries after the time Tx and up to, and including, the current time Tc.

17. The method of claim 16, wherein said request is issued from an appliance in a switching fabric to reconstruct a version of said primary storage including only write requests processed through the time Tx and ignoring write requests issued after the time Tx until the current time Tc.

18. The method of claim 15, wherein each of said plurality of partial journals includes partial journal entries for write requests received on a particular input port to a switch, said each partial journal being stored in a portion of memory associated with said input port, wherein journaling of write requests to that input port is performed by a processor associated with said input port.

* * * * *